Figure 1A:
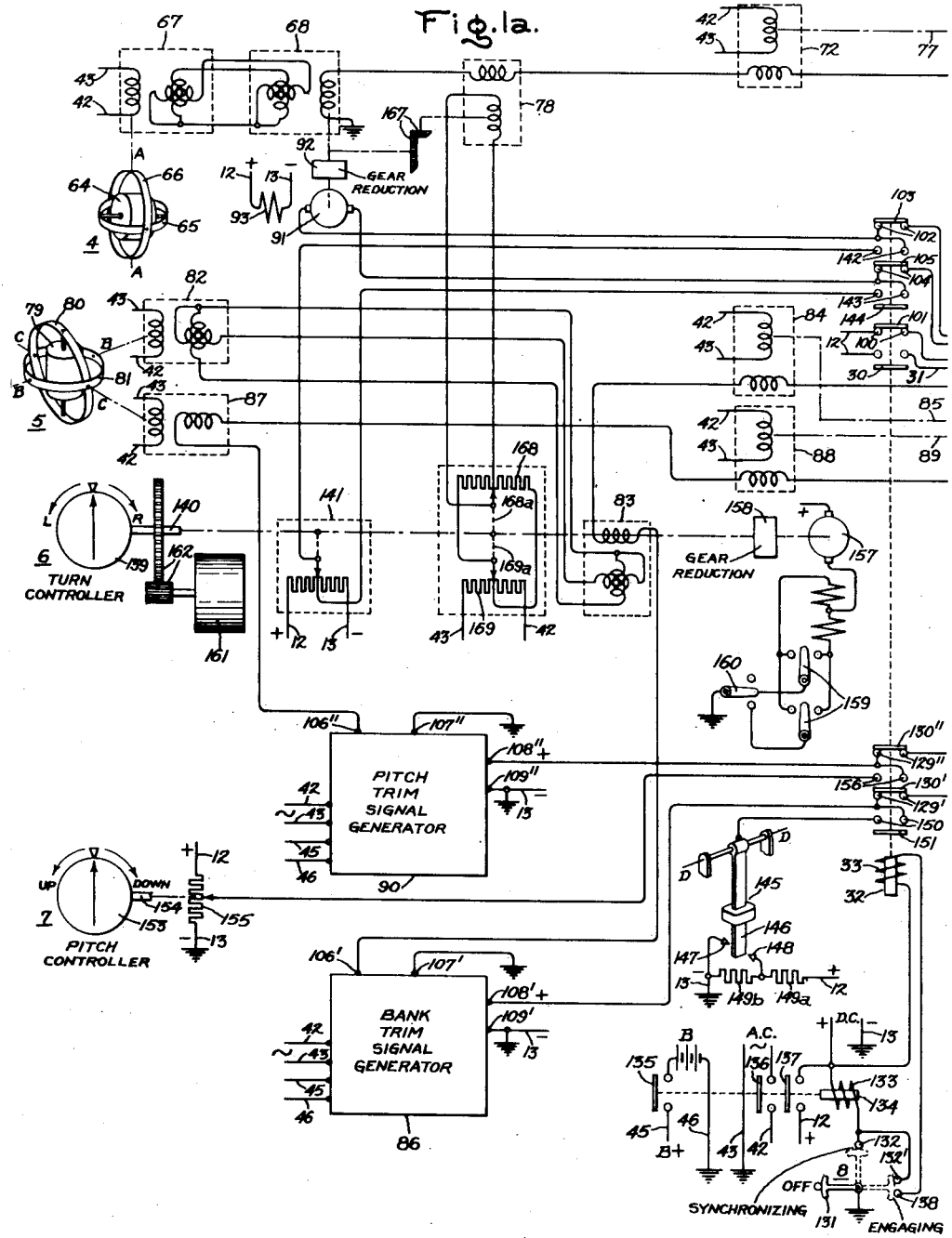

Oct. 9, 1951

C. M. YOUNG ET AL 2,570,905

AUTOMATIC PILOT

Filed March 19, 1945

5 Sheets-Sheet 1

Inventors:
Charles M. Young,
Robert L. Wanamaker,
by Harry E. Dunham
Their Attorney.

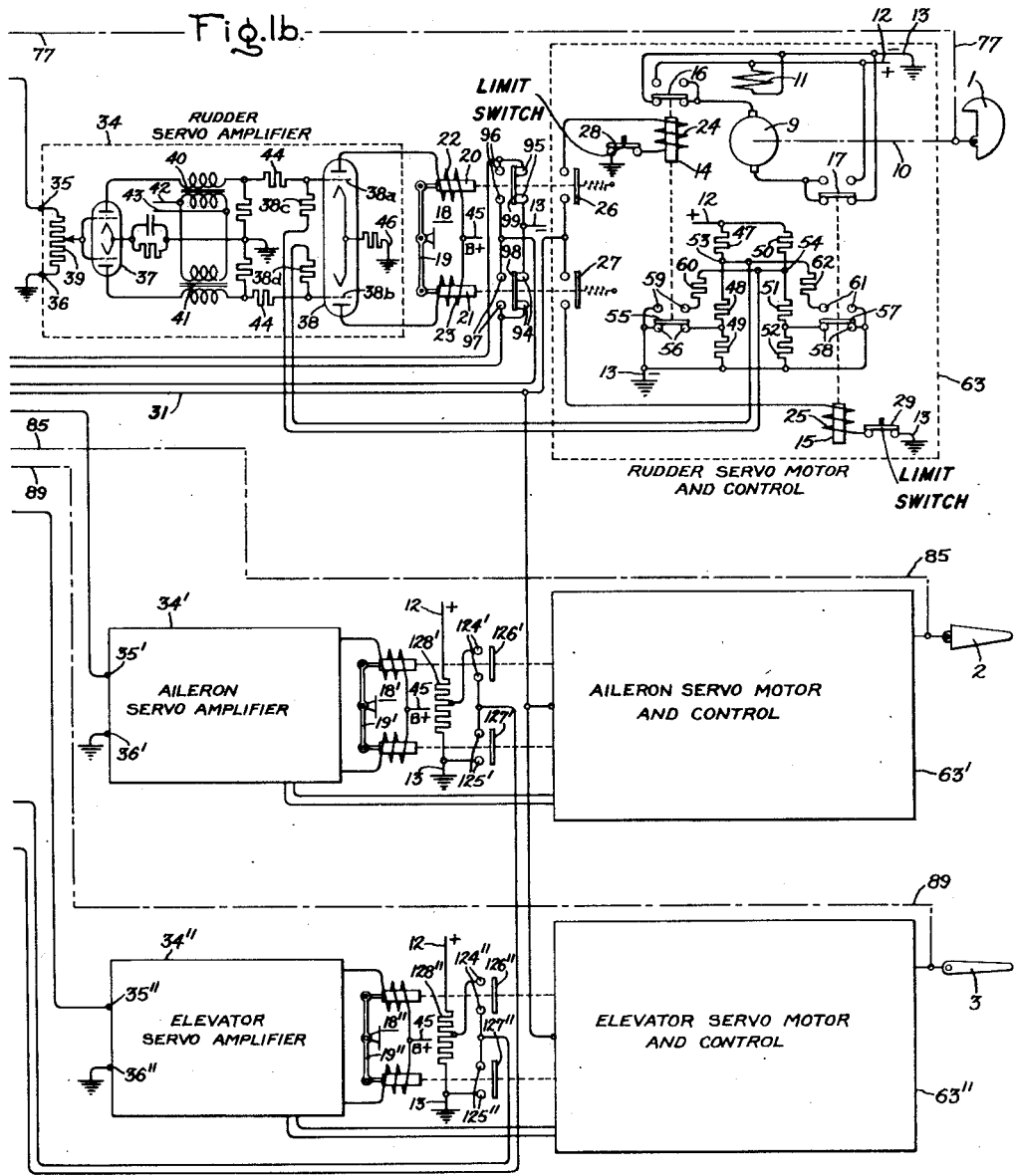

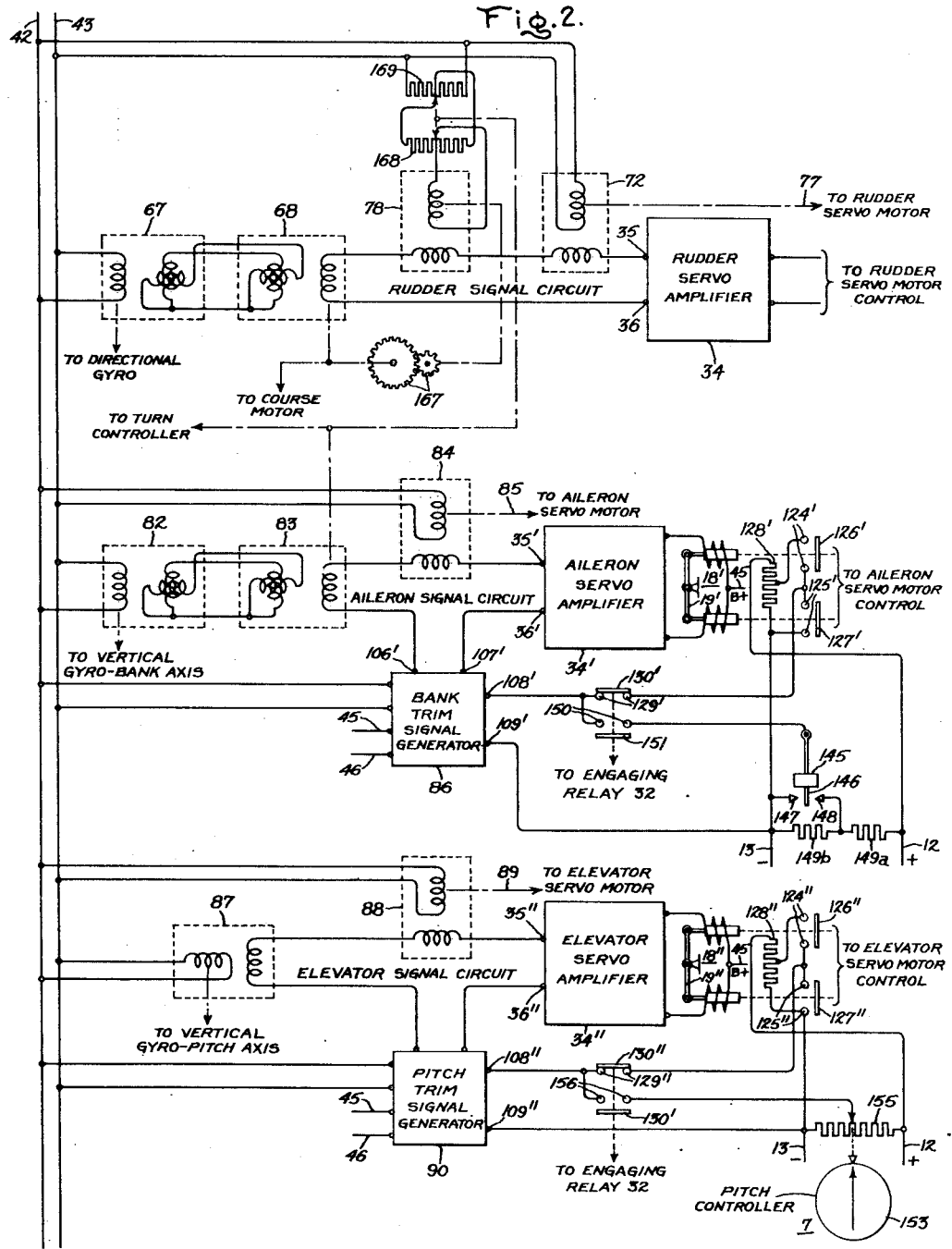

Oct. 9, 1951　　　　　C. M. YOUNG ET AL　　　　　2,570,905
AUTOMATIC PILOT

Filed March 19, 1945　　　　　　　　　　　　　　　　5 Sheets-Sheet 4

Inventors:
Charles M. Young,
Robert L. Wanamaker,
by Harry E. Dunham
Their Attorney.

Oct. 9, 1951 C. M. YOUNG ET AL 2,570,905
AUTOMATIC PILOT
Filed March 19, 1945 5 Sheets-Sheet 5

Inventors:
Charles M. Young,
Robert L. Wanamaker,
by Harry E. Dunham
Their Attorney.

Patented Oct. 9, 1951

2,570,905

UNITED STATES PATENT OFFICE 2,570,905

AUTOMATIC PILOT

Charles M. Young and Robert L. Wanamaker, Schenectady, N. Y., assignors to General Electric Company, a corporation of New York Application March 19, 1945, Serial No. 583,530

18 Claims. (Cl. 244—77)

This invention relates to aircraft control systems, and more particularly to control systems for stabilizing aircraft while in flight known to the art as an automatic pilot.

Automatic pilots are known in the prior art which will function, when engaged, to actuate the rudder, aileron and elevator controls of an aircraft so as to stabilize the aircraft about the turn, bank and pitch control axes. In use it is necessary to synchronize the attitude called for by the automatic pilot with the instant attitude of the aircraft about the three control axes prior to engaging the automatic pilot as otherwise a violent and possibly dangerous lurching movement of the aircraft will occur when the automatic pilot is engaged. Heretofore it has been common practice to accomplish synchronization by manually adjusting trim controls operating in conjunction with the turn, bank and pitch control channels. This synchronizing operation is a laborious one, and a general object of the present invention is to provide new and improved means for accomplishing the synchronizing operation automatically.

A further object of the invention is to provide a manually operated adjusting means for adjusting the stabilized attitude maintained by the automatic pilot which cooperates with the synchronizing means in such a way that after synchronizing and engaging the automatic pilot, the stabilized attitude of the aircraft gradually changes from the attitude at the time of engagement to the attitude called for by the attitude-adjusting means whereby to maintain a predetermined relationship between the position of the attitude-adjusting means and the stabilized attitude of the aircraft.

In automatic pilots it is common to use a directional gyro to measure and control the attitude or azimuth position of the aircraft about the turn axis, and for straight and level flight the directional gyro provides a satisfactory azimuth reference. However, when the aircraft becomes banked, as when coordinated turns are made, the directional gyro becomes subject to a cyclic error in position indication which will be referred to as gimbal error. In maneuvering types of automatic pilots where a turn signal is introduced by displacing, electrically or mechanically, a signal generator actuated by the directional gyro, gimbal error causes a cyclic variation in the rate of turn which is undesirable. Another object of the present invention is to provide means for compensating for gimbal error whereby this undesired variation in rate of turn is eliminated.

A further object of the invention is to provide a new and improved automatic pilot having greatly simplified controls whereby the automatic pilot can be synchronized and engaged by operation of a control switch, and can be subsequently used to stabilize the aircraft in straight and level flight, or to perform coordinated stabilized maneuvers by adjusting turn and pitch controllers.

Another object of the invention is to provide a new and simplified arrangement for obtaining the correct bank angle of the aircraft at all speeds during maneuvering turns.

Further objects and advantages of the invention will become apparent as the following description proceeds.

Figure 3:
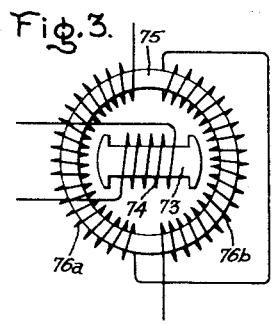
Figure 4:
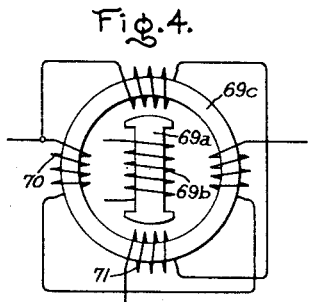
Figure 5:
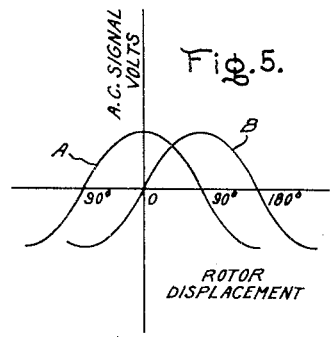
Figure 6:
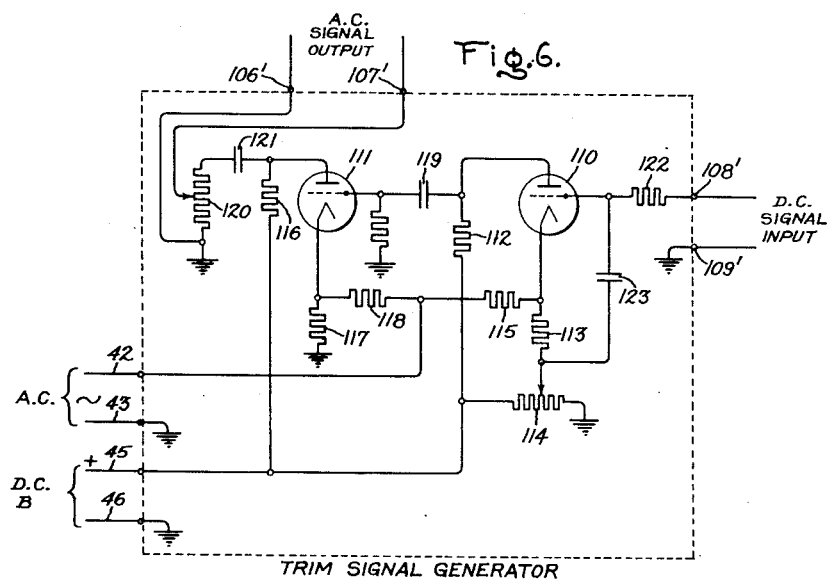
Figure 8:
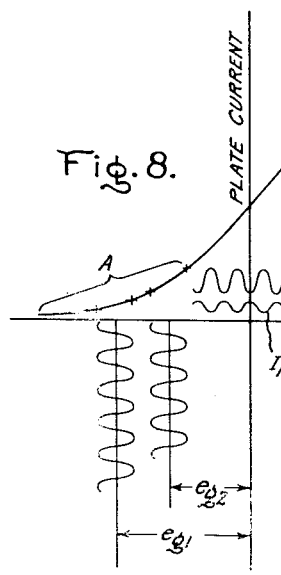
Figure 7:
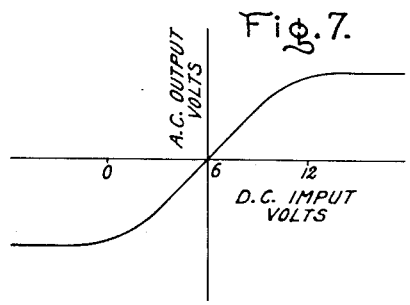
Figure 9:
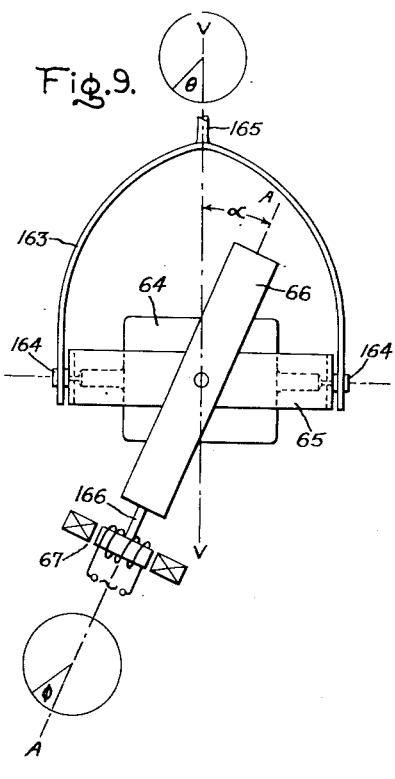
Figure 10:
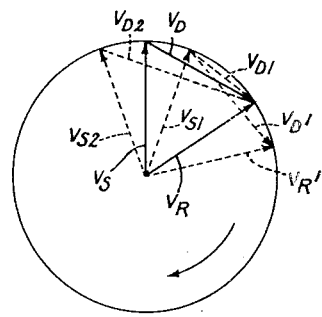
Figure 11:
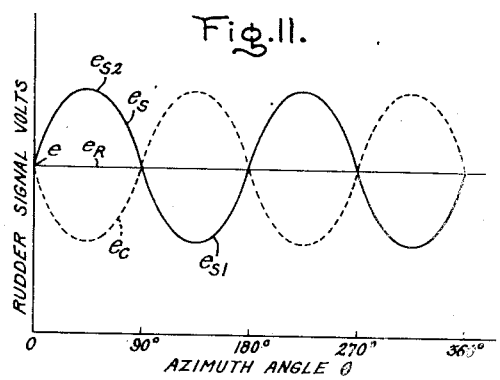
Figure 12:
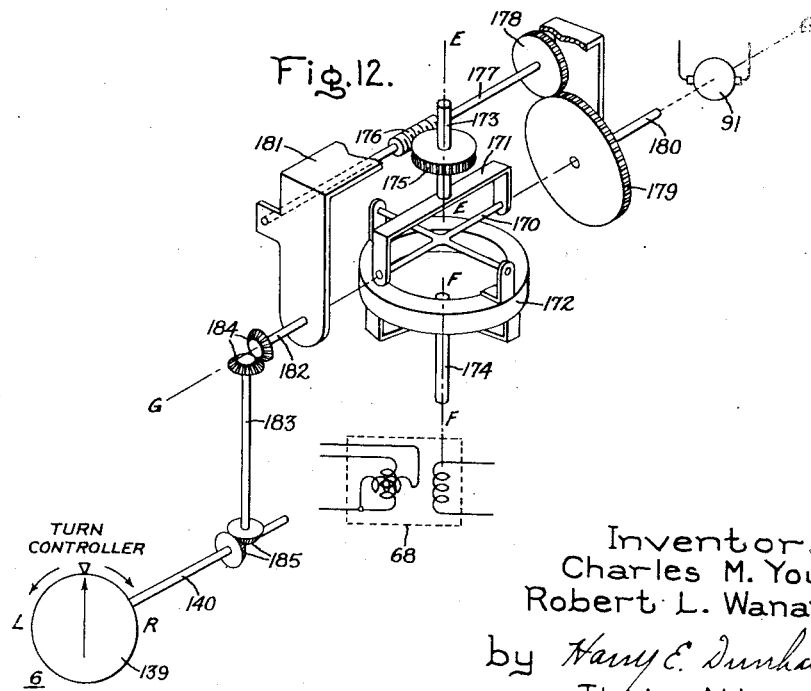

For a better understanding of the invention, reference should be made to the following detailed description and the accompanying drawings in which Figs. 1a and 1b, taken together, illustrate in schematic form a complete automatic pilot control system embodying the subject matter of the present invention; Fig. 2 is a schematic wiring diagram relating particularly to the rudder, aileron and elevator signal circuits; Fig. 3 illustrates the construction of a typical single-phase selsyn used for control purposes; Fig. 4 illustrates the construction of a typical two-phase selsyn used for control purposes; Fig. 5 shows the relationship between rotor position and the signal output voltages for the single- and two-phase selsyns shown in Figs. 3 and 4; Fig. 6 shows the electrical construction of the trim signal generator; Fig. 7 shows the relationship between the input and output voltages of the trim signal generator; Fig. 8 shows the relationship between the grid voltage and plate current of one of the tubes in the trim signal generator which is helpful in understanding operation; Fig. 9 is a diagram of the directional gyro modified for explaining gimbal error; Fig. 10 is a vector diagram useful in explaining gimbal error; Fig. 11 shows a series of curves relating to certain signal voltages and the azimuth position of the aircraft useful in explaining the operation of the system; and Fig. 12 is a modified arrangement for correcting gimbal error.

By way of a preliminary description, the automatic pilot control system forming the subject matter of the present invention constitutes a means for actuating a rudder 1, ailerons 2, and elevators 3 of an aircraft to control movements of the aircraft about the turn, bank and pitch axes respectively. Displacements of the aircraft about the turn axis are measured by means of a conventional directional gyro, indicated generally at 4, while displacements of the aircraft about the bank and pitch axes are measured by means of a conventional vertical or horizon gyro, indicated generally at 5. In order to stabilize the aircraft about the turn axis, means are provided for actuating the rudder 1 in a direction to correct for displacements about the turn axis as measured by the directional gyro 4. Similarly, to stabilize the aircraft about the bank and pitch axes, means are provided for actuating the ailerons 2 and elevators 3 in a direction to correct for displacements about the bank and pitch axes as measured by the vertical gyro 5. In order to permit the making of properly banked turns to the right or left, there is provided a turn controller, indicated generally at 6, which, when actuated, causes appropriate movements of the rudder 1 and the ailerons 2 to obtain a turn and bank in the desired direction. For the purpose of changing the stabilized pitch attitude of the aircraft, there is also provided a pitch controller indicated generally at 7, which, when actuated, causes the elevators 3 to be deflected in a proper direction to change the pitch attitude of the aircraft. For the purpose of synchronizing and engaging the automatic pilot, there is provided a control switch 8 having off, synchronizing, and engaging positions. In the "off" position the entire automatic pilot system is deenergized. In the "synchronizing" position of the control switch, the automatic pilot system is energized, but the servo system is disabled so that the control surfaces of the airplane are not actuated. However, in the synchronizing position, the stabilized attitude of the aircraft about the three control axes called for by the automatic pilot is synchronized to the attitude of the aircraft about the three control axes. When the control switch is moved to the "engaging" position, the servo mechanism is rendered active and thereafter the automatic pilot system functions to stabilize the aircraft about the three control axes in a manner which will be subsequently described in greater detail.

For the purpose of facilitating the description of the automatic pilot system, it is convenient to consider the system as being made up of two more or less distinct parts, one of which may be termed the control signal system and the other may be termed the servo system by means of which the control surfaces of the aircraft are actuated in accordance with signals received from the control signal system. It is also convenient at times to break down the description into a consideration of the three control channels which are in a great many respects identical or similar, these being the rudder, aileron and elevator control channels.

In general, the control signal system comprises rudder, aileron and elevator signal circuits into which various control signal voltages are introduced and algebraically added to produce resultant rudder, aileron and elevator control signals. These resultant voltages are A.-C. voltages variable in magnitude and polarity. The rudder, aileron and elevator servo systems are means for actuating the rudder, aileron and elevator control surfaces in accordance with the magnitude and polarity of the resultant control signals derived from the rudder, aileron and elevator signal circuits.

Referring now to the servo system of the rudder control channel, the rudder 1 is actuated by an electric motor 9 which drives the rudder through suitable shafting and gearing, which is not shown for the sake of simplicity, the interconnection being indicated by means of a dotted line 10. The rudder servomotor 9 is illustrated as being a D.-C. type having a shunt field 11 continuously energized from D.-C. supply lines 12 and 13. The direction of rotation of the servomotor 9 is controlled by means of forward and reverse contactors 14 and 15, which operate reversing switches 16 and 17. The reversing switches 16 and 17 are connected as shown, so that by selectively energizing the contactors 14 and 15 the armature of the motor 9 can be connected to the power leads 12 and 13 with armature polarity in either direction to give the desired direction of rotation. It will also be noted that when both of the forward and reverse contactors 14 and 15 are deenergized, the armature of the motor 9 is shorted to give a desirable dynamic braking action.

For the purpose of selectively energizing the forward and reverse contactors 14 and 15, to control the direction of rotation of the rudder servomotor 9, there is provided a balanced armature relay 18 having a balanced armature member 19 to which are connected opposed armatures or plungers 20 and 21. The armatures 20 and 21 are provided with energizing windings 22 and 23 which are connected to be differentially energized in accordance with the output of the rudder servo amplifier as will be described. When the currents flowing in the windings 22 and 23 are equal, the pivoted armature 19 of the balanced turn relay 18 remains in the center position as shown. However, when the currents flowing to the windings 22 and 23 are unbalanced, the armature member 19 rotates in a clockwise or counterclockwise direction, depending on whether the current in winding 22 or 23 predominates. The forward and reverse contactors 14 and 15 are provided with energizing windings 24 and 25, the energizing circuits of which are arranged to be selectively completed through switches 26 and 27 connected to and operated by the balanced armature member 19 of the balanced relay 18. Thus, when armature 19 rotates counterclockwise, switch 26 closes, energizing contactor 14 to cause motor 9 to rotate in a forward direction, and when armature member 19 rotates counterclockwise, switch 27 closes, energizing contactor 15, causing the motor 9 to rotate in the reverse direction. Limit switches 28 and 29, actuated by any well known arrangement, may be provided in the energizing circuits of the forward and reverse contactors to prevent overtravel of the servomotor.

For the purpose of disabling the servomotor 9 when the control switch 8 is in the synchronizing position, there is provided a normally open, interlock switch 30 which operates when closed to complete a circuit between the D.-C. power lead 12 and the conductor 31 through which current flows to the energizing windings 24 and 25 of the forward and reverse contactors 14 and 15. The interlock switch 30, along with a number of other switches which will later be described, is operated by an engaging relay 32 having an energizing winding 33, which is connected to the D.-C. power supply when the control switch 8 is in the clockwise engaging position, but deenergized when the control switch is in the center synchronizing position and the counterclockwise "off" position. Thus, the forward and reverse contactors 14 and 15 will be deenergized and the servomotor 9 will be stationary regardless of the position of the balanced current relay 18 when the control switch 8 is in any position except the engaging position.

In order to provide means for differentially energizing the windings 22 and 23 of the balanced relay 18, and thereby control the direction of rotation of the servomotor 9 in accordance with the polarity of the A.-C. signal voltages received from the control signal system, there is provided a rudder servo amplifier 34. The servo amplifier 34 is a normally balanced electronic control device which is used to differentially control the current supplied to the windings 22 and 23 of the balanced relay in accordance with the polarity of A.-C. signal voltages supplied to input terminals 35 and 36. While any one of a number of different types of discriminator rectifier-amplifiers may be used to accomplish this function, for the purpose of illustration there is shown a two-stage amplifier comprising a twin triode-discriminator electron tube 37 and a twin triode-amplifier electron tube 38. An input A.-C. signal voltage supplied to the input terminals 35 and 36, the magnitude of which is adjustable by means of a suitable gain control potentiometer 39, is fed to the grids of the discriminator tube 37. The plates of the tube 37 are supplied with alternating current from transformers 40 and 41, the primary windings of which are energized from A.-C. supply lines 42 and 43. The transformer secondary windings are connected so that the voltages supplied to the plates of the tube 37 are 180 electrical degrees out of phase. In this manner the rectified output of the two sections of the tube 37 are made to vary oppositely in accordance with the polarity of the input signal, the input signal being in phase or 180 degrees out of phase with the A.-C. supply voltage. The rectified outputs of the two sections of the discriminator tube 37 are fed to the tube grids 38a and 38b of the amplifier tube 38 after passing through suitable filtering impedances 44. The positive terminal 45 of a suitable D.-C. "B" power supply is connected to the two opposite plates of the amplifier tube 38 through the two energizing windings 22 and 23 of the balanced relay 18, the common cathode return circuit being connected to the negative terminal 46 of the "B" power supply. In view of the foregoing, it will now be apparent to those skilled in the art that the output of the two sections of the amplifier tubes 38, and consequently the differential current supplied to the two energizing windings 22 and 23 of the balanced relay 18, will vary in accordance with the polarity and magnitude of the A.-C. input signal voltage supplied to the input terminals 35 and 36 within saturation limits of the amplifier.

In order to achieve stability of the servo system, it is desirable that the average speed of the servomotor 9 be varied in accordance with the magnitude and polarity of the input signal voltage supplied to the input terminals 35 and 36, at least within a limited range including relatively small input voltages of both polarities. This is accomplished by varying the relative bias voltages connected to the grids 38a and 38b of the amplifier tube 38.

The bias voltages connected to the grids 38a and 38b are derived from two resistor networks. One of the networks comprises serially connected resistors 47, 48 and 49, which are connected across the D.-C. power supply lines 12 and 13, while the other networks comprise similar resistors 50, 51 and 52, also connected across the D.-C. supply lines 12 and 13. Normally the resistor 49 is shorted out by a switching member 55 actuated by forward contactor 14, which bridges a set of contacts 56 when the contactor 14 is deenergized. Also, resistor 52 is normally shorted out by a bridging member 57 actuated by the reverse contactor 15, which bridges a set of contacts 58 when the contactor 15 is deenergized. The resistors are selected so that values of the resistors 47 and 50, 48 and 51, and 49 and 52 are equal. Therefore, normally, the voltage of the junction point 53 of resistors 47 and 48 is equal to the voltage of the junction point 54 of the resistors 50 and 51. The junction points 53 and 54 are connected to the grids 38b and 38a, respectively, through suitable biasing resistors 38c and 38d, and thus, normally, the bias voltages applied to the grids 38a and 38b are equal. However, in order to obtain the desired proportioning action in the speed of the servomotor 9, the voltages of the junction points 53 and 54, and consequently the bias voltages applied to the grids 38b and 38a, are varied oppositely in response to energization of the forward contactor 14, and are varied oppositely in the reverse sense in response to energization of the reverse contactor 15. Thus, when the forward contactor 14 is energized, bridging member 55 moves upwardly, opening contacts 56 and removing the short around the resistor 49, thereby raising the voltage of junction point 53. In moving upward, the bridging member 55 bridges a set of contacts 59 connecting a resistor 60 in parallel with the resistors 51 and 52, thereby lowering the voltage of the junction point 54. On the other hand, when reverse contactor 15 is energized, bridging member 57 moves upwardly, opening contacts 58 and removing the short around resistor 52, thereby raising the voltage of the junction 54. In moving upward, the bridging member 57 bridges a set of contacts 61, connecting a resistor 62 in parallel with resistors 48 and 49, thereby lowering the voltage of junction point 53.

The opposite variation of the grid bias voltages connected to the grids 38a and 38b affects the balance currents of the amplifiers in such a way that the balanced relay 18 and the forward and reverse contactors 14 and 15 chatter. The percentage of chatter cycle time that the forward and reverse contactors remain in the energized position depends, within a limited proportional range, on the magnitude of the input signal supplied to the terminals 35 and 36. Thus the percentage of the chatter cycle time the forward and reverse contactors remain energized determines the average armature voltage supplied to the servomotor 9 so that the average speed of rotation of the motor 9 also varies in accordance with the magnitude of the input signal voltage which is the desired condition.

By way of further explanation of the rudder servo system, let it be assumed that the input signal voltage supplied to the input terminals 35 and 36 is zero. For this condition the servo amplifier 34 will be balanced so that equal currents are supplied to the energizing windings 22 and 23 of the balanced relay 18 so that the balance relay remains in the center position shown. Therefore, switches 26 and 27 will be open, and forward and reverse contactors 14 and 15 will be deenergized so that servomotor 9 is stationary. Now let it be assumed that a small input signal voltage is supplied to the terminals 35 and 36 of the servo amplifier having a polarity such that the voltage of the grid 38a is increased while the voltage applied to the grid 38b is decreased. This causes more current to flow through the winding 22 and less current to flow through the winding 23 of the balanced relay 18, whereupon the armature member 19 rotates in a counterclockwise direction, closing switch 26 and energizing forward contactor 14 whereupon motor 9 rotates in a forward direction. However, when forward contactor 14 picks up, the bias voltage connected to grid 38a decreases while the bias voltage connected to grid 38b increases due to the openings of contacts 56 and the closing of contacts 59 in response to the upward movement of the bridging member 55 as pointed out above. This restores the balance of the servo amplifier whereupon the balanced relay returns to the center position, deenergizing forward contactor 14. However, the reclosure of the contacts 56 and the opening of the contacts 59 by the bridging member 55 operated by the contactor 14 permit the amplifier to again become unbalanced due to the input signal voltage, and as a result a chattering action of the contactor 14 takes place so that the motor 9 rotates in a forward direction at a fairly slow speed. As the input signal voltage is increased, the percentage of the chatter time the contactor 14 remains in the energized position increases, and consequently the forward speed of the motor 9 increases. When the input signal voltage reaches a sufficiently high value, the balanced relay 18 will remain in the counterclockwise position so that the motor 9 will rotate at full speed in the forward direction. On the other hand, if the relatively small input voltage of the opposite polarity is applied to the terminals 35 and 36, the voltage of the grid 38b will be increased while the voltage of the grid 38a will be decreased. This causes the balanced relay 18 to rotate in a clockwise direction, closing switch 27 and energizing reverse contactor 15 so that the servomotor 9 rotates in the reverse direction. However, when the reverse contactor 15 is energized, the voltage of the grid 38b is decreased and the voltage of the grid 38a is increased due to the opening of the contacts 58 and closing of contacts 61 by the bridging member 57, as explained above. This restores the balance of the servo amplifier so that the balanced relay returns to the center position and reverse contactor 15 is deenergized. The reclosure of the contacts 58 and the opening of contacts 61, in response to return movement of the bridging member 57 operated by the reverse contactor 15, permits the servo amplifier to again become unbalanced in response to the input signal. Therefore, the balanced relay 18 and the reverse contactor 15 chatters, whereupon the motor 9 rotates in a reverse direction at the relatively slow speed. As the input signal voltage is increased, reverse contactor remains in the closed position a greater length of time, and the reverse speed of the motor 9 is increased until finally a point is reached at which the balanced relay 18 remains in a clockwise rotated position when the motor 9 runs at full speed in the reverse direction.

Summarizing the rudder servo system thus far described, it may be said that the rudder servo amplifier 34, the balanced relay 18, the rudder servomotor, and the associated relays and contactors indicated generally at 63, constitute a means for actuating the aircraft rudder 1 in a direction dependent upon the polarity of the input signal supplied to the servo amplifier and at a speed which is proportional, within limits, to the magnitude of the input signal voltage.

The aileron and elevator servo systems comprise servo amplifiers, balanced relays, and servomotors with associated control which are constructed and operated in identical manner to the rudder servo system previously described, and therefore corresponding parts have been given the same reference numerals except that those relating to the aileron control channel have been primed while those numerals referring to the elevator control channel have been double-primed.

Having described in detail the construction and operation of the rudder, aileron and elevator servo systems, the description now will be directed to the rudder, aileron and elevator control signal systems by means of which control signals are produced for actuating the servo systems to give the desired controlling action for stabilizing and maneuvering the aircraft.

For the purpose of facilitating the following description the electric circuits of the automatic pilot system relating particularly to the rudder, aileron and elevator signal circuits have been separated out from the overall system shown in Figs. 1a and 1b, and shown in equivalent form on Fig. 2 of the drawing.

The manner in which control signal voltages are introduced into the rudder signal circuit will now be considered. As mentioned above, a conventional directional gyro 4 may be used as a reference to measure displacement of the aircraft about the vertical or turn axis. The directional gyro is shown as comprising a gyro rotor 64, which is rotated by any suitable motor means not shown. The gyro is mounted for three degrees of freedom in a conventional gimbal system comprising an inner or horizontal gimbal ring 65 and an outer or vertical gimbal ring 66. The directional gyro spin axis lies in a horizontal plane, and, due to the characteristic gyroscopic property of rigidity, the vertical gimbal ring 66, which is mounted in a case (not shown) for rotation about a normally vertical axis extending in the direction AA, tends to maintain its azimuth orientation in space.

For the purpose of introducing into the rudder signal circuit a control voltage variable in magnitude and polarity in accordance with the direction and amount of displacement of the aircraft about the turn axis, there are provided a pair of cascade-connected polyphase selsyn devices 67 and 68. While any suitable type of polyphase selsyn may be used, there is shown in Fig. 4 of the drawing a two-phase type which is suitable for the intended purpose. It should be noted that in using the term "two-phase" or polyphase, space phase rather than time phase is the intended meaning. Referring to Fig. 4, a typical polyphase selsyn is shown as comprising a rotor 69a of magnetic material carrying a rotor or primary winding 69b. The rotor 69a rotates within an annular core 69c of magnetic material, the stator core carrying two sets of stator windings 70 and 71, the windings of each set being cumulatively connected. The stator windings 70 and 71 are so spaced that the voltages induced therein when the rotor winding 69b is excited with alternating current vary as sine and cosine functions of the rotor displacement. Curves A and B of Fig. 5 of the drawing show how the voltages induced in windings 70 and 71 vary as the rotor 69a is displaced either to the right or left of the position shown.

The polyphase stators of the selsyn 67 and 68 are connected back-to-back, as shown. In addition the rotor of the selsyn 67 is connected to the A.-C. supply lines 42 and 43 while the rotor of the selsyn 68 is connected to the rudder signal circuit. The rotor of the selsyn 67 is coupled mechanically to the vertical gimbal ring 66 of the directional gyro while the stator winding is mounted on the gyro case. Therefore, angular movement of the aircraft about the turn axis causes a relative movement between the rotor and stator windings of the selsyn 67, which causes a voltage to appear across the rotor winding of the selsyn 68 in a well known manner. By rotating the rotor of the selsyn 68 relative to the stator, the zero voltage or null point may be made to correspond to any azimuth position of the directional gyro relative to the aircraft, and in this manner the azimuth heading to be held by the automatic pilot can be varied to any desired direction. For this reason the selsyn 68 will be referred to as a course setter or a course-setter selsyn.

In order to stabilize the aircraft and prevent hunting or overshooting, it is desirable to limit the displacement of the control surface to an amount approximately proportional to the displacement of the aircraft about the control axes. In the rudder channel this is accomplished by the provision of a follow-up signal generator selsyn 72 which is connected to introduce a voltage into the rudder signal circuit in opposition to the displacement signal voltage as the rudder moves in response to the displacement signal. The single-phase selsyn 72 may be constructed as shown in Fig. 3 of the drawing. Referring to Fig. 3, a typical single-phase selsyn is shown as comprising a rotor 73 of magnetic material carrying a primary or exciting winding 74. The rotor 73 rotates within an annular core 75 of magnetic material, on which are wound two differentially connected stator windings 76a and 76b. When the selsyn is in the null or zero voltage position shown, the voltages induced in the stator windings cancel out so that the net stator voltage is zero. As the rotor is rotated in either direction from the null point, a net voltage is induced in the stator windings, the phase of which relative to voltage supplied to the primary winding 74 depends upon the direction of displacement from the null point and the magnitude of which depends upon the amount of displacement. The stator voltage varies approximately sinusoidally with the angular movement of the rotor as indicated, for example, by the curve B in Fig. 5 of the drawing.

In order to introduce a voltage in the rudder signal circuit proportional to rudder displacement, the secondary winding of the rudder follow-up selsyn is connected in series circuit relation in the rudder signal circuit, while the rotor winding is energized from the A.-C. supply lines 42 and 43. Also, the rotor of the selsyn 72 is mechanically coupled to the rudder control surface 1 and the servomotor by means of a mechanical follow-up connection indicated schematically by the dotted line 77.

Also connected in series circuit relation in the rudder signal circuit is the secondary winding of another single-phase selsyn 78 which will be referred to as the gimbal error selsyn. The gimbal error selsyn 78 acts to compensate for the gimbal error of the directional gyro 4, as will later be described.

Referring now to the control signal system of the aileron channel, the vertical or horizon gyro 5, as mentioned above, is used as a reference for measuring displacement of the aircraft about the pitch and bank axes. The vertical gyro 5, which is of conventional construction, comprises a rotating gyro element 79 having an approximately vertical spin axis, the gyro being rotated by any suitable motor means not shown. The vertical gyro is rotated for three degrees of freedom in a conventional gimbal system comprising a vertical gimbal ring 80 and a horizontal gimbal ring 81. The vertical gyro is oriented so that when the aircraft is level, the axis of rotation BB of the gimbal 81 lies in the direction of the longitudinal axis of the aircraft while the axis of rotation CC of the gimbal 80 lies in the direction of the transverse axis of the aircraft. Due to the characteristic gyroscopic property of rigidity, the vertical gyro tends to maintain the orientation of its spin axis in space so that displacement of the aircraft about the axes BB and CC can be measured by movement of the gyro case relative to the gimbals 80 and 81 in a well known manner. Conventional erecting means (not shown) may be provided to keep the gyro spin axis approximately vertical.

For the purpose of introducing control voltages into the aileron signal circuit variable in polarity and magnitude in accordance with displacement of the aircraft about the bank axis, cascade-connected polyphase selsyns 82 and 83 are provided. The selsyns 82 and 83 are similar in construction to the selsyns 67 and 68 previously described in connection with the rudder signal channel, and by energizing the rotor of the selsyn 82 from the A.-C. supply line 42 and 43 and by connecting the rotor winding of the selsyn 83 and the aileron signal circuit, a voltage is introduced into the aileron signal circuit in response to rotation of the rotor of either selsyn 82 or 83 relative to its associated stator winding. The rotor of the selsyn 82 is mechanically coupled to the gimbal 81 of the vertical gyro 5 so as to be responsive to banking movements of the aircraft about the bank axis BB, the stator of the selsyn 82 being mounted on the gyro case. In this manner, control voltages are introduced into the aileron signal circuit variable in magnitude and polarity in accordance with the direction and amount of banking movement about the bank axis BB. The rotor of the selsyn 83 may be rotated relative to its stator to obtain a zero voltage output for any banking attitude of the aircraft and, therefore, by adjusting the position of the rotor the stabilized banking attitude of the aircraft may be adjusted as desired. For this reason the selsyn 83 will be referred to as the bank setter, or bank-setter selsyn.

Also connected in series circuit relation in the aileron signal circuit is the secondary winding of a single-phase aileron follow-up selsyn 84, the rotor or primary winding of which is energized from the A.-C. supply lines 42, 43. The aileron follow-up selsyn 84 is similar in construction to the rudder follow-up selsyn 72 previously described, the rotor being mechanically coupled to the aileron control surface 2 and aileron servomotor as indicated by the dotted line 85. The aileron follow-up selsyn acts to limit the displacement of the aileron control surface to an amount approximately proportional to displacement of the aircraft about the bank axis.

Also connected in series circuit relation in the aileron signal circuit are the output terminals of a bank trim signal generator 86. The construction of the bank trim signal generator, by means of which bias signals are introduced into the aileron signal circuit for automatically synchronizing the aileron channel and for introducing bank trim voltages during maneuvering turns, will later be described.

Referring now to the control signal system of the elevator channel, there is provided, for the purpose of introducing into the elevator signal circuit a voltage variable in magnitude and polarity in accordance with displacement of the aircraft about the pitch axis, a single-phase selsyn 87. The selsyn 87 is similar in construction to the follow-up single-phase selsyn previously described, and comprises a rotor winding connected to be energized to the A.-C. supply line 42 and 43, and a stator winding connected to the elevator signal circuit. The rotor of the selsyn 87 is mechanically coupled to the gimbal 80 of the vertical gyro 5 while its stator is mounted on the gyro case. In this manner, relative movement between the rotor and the stator, and consequently a voltage appearing across the stator winding, is obtained which is variable in magnitude and polarity in accordance with displacement of the aircraft about the pitch axis of the vertical gyro CC. Also connected in series circuit relation in the elevator signal circuit is the stator winding of a single-phase elevator follow-up selsyn 88, the rotor winding of which is connected to be energized from the A.-C. supply line 42, 43. The rotor of the elevator follow-up selsyn 88 is mechanically coupled to the elevator control surface 3 and the elevator servomotor by means of a mechanical connection indicated by the dotted line 89. In a manner similar to the rudder and aileron follow-up selsyn, the elevator follow-up selsyn 88 acts to limit the displacement of the elevator control surface to an amount which is approximately proportional to the displacement of the aircraft about the pitch axis.

Also connected in series circuit relation in the elevator signal circuit are the output connections of a pitch-trim signal generator 90. The construction of the pitch-trim signal generator is similar to the bank-trim signal generator 86, and the manner in which it introduces trim signals in the elevator signal circuit for automatic synchronization and for adjusting the pitch attitude of the aircraft during stabilized flight will later be described.

It will be apparent from the description of the automatic pilot system thus far described that the selsyn signal generators actuated by the directional gyro 4 and the vertical gyro 5 will introduce displacement control voltages in the rudder, aileron and elevator signal circuits to cause actuation of the rudder, ailerons and elevators in a direction to stabilize the aircraft about the turn, bank and pitch axes. However, while flying manually prior to engaging the automatic pilot, it is very likely that the output voltages of the various selsyn signal generators which vary with the attitude of the aircraft about the control axes, will not be zero so that the servo amplifiers 34 will be unbalanced. If the servo system is engaged while the automatic pilot is in this condition, the control surfaces will be actuated suddenly, causing a lurching movement which may be dangerous. One of the principal features of the present invention is the provision of means for automatically synchronizing the automatic pilot prior to engagement whereby the possibility of such a dangerous lurching movement is precluded. The means by which automatic synchronization of each of the three control channels is obtained will now be described.

In general, automatic synchronization in each of the three control channels is obtained by the provision of means responsive to an unbalanced condition of the servo amplifier for reducing to zero the input signal supplied to the amplifier from its associated signal circuit, and thereby restoring the balance of the amplifier.

Referring now to automatic synchronization of the rudder control channel, the balanced current relay 18, which is used to control the reversible servomotor 9, is also used as the means responsive to an unbalanced condition of the amplifier 34 for operating the automatic synchronizing means. In order to provide means for reducing the amplifier input signal voltage to zero in response to an unbalanced condition of the amplifier, as indicated by displacement of the balanced relay from its center position, there is provided a reversible motor 91 which is mechanically coupled to the rotor of the coursesetter selsyn 68 through a suitable gear reduction 92. Reversible motor 91 is illustrated as a D.-C. motor having a shunt field winding 93 energized from the D.-C. power supply lines 12 and 13. The direction of rotation of the motor 91 is controlled by means of the polarity of the voltage applied to the armature. Switching means controlled by the balanced relay 18 are provided for supplying direct current to the armature of the motor 91, the polarity of which is determined by the direction of unbalance of the balanced relay 18, whereby the motor 91 operates in a direction to vary the output of the course-setter rotor in a proper direction to reduce the input voltage of the amplifier to zero and restore the balanced relay to the center position in which the reversible motor 91 is deenergized. The control of the direction of rotation of the reversible motor 91 by the balanced relay 18 is accomplished by the provision of four sets of contacts 94, 95, 96 and 97 which are adapted to be engaged by two bridging members 98 and 99, which are connected to and actuated by the balanced armature member 19 of the balance relay 18. One of each of the pairs of contacts 96 and 97 are connected together, and are also connected to the positive line 12 of the D.-C. power supply through contacts 100, which are normally closed by a bridging member 101 operated by the engaging relay 32. The other of the set of contacts 96 is connected to one side of the reversible motor 91 through the contacts 102 which are normally closed by the bridging member 103 operated by the engaging relay 32. The other of the set of contacts 97 is connected to the opposite side of the reversible motor 91 through contacts 104, which are normally closed by a bridging member 105 also operated by the relay 32. One of each of the sets of contacts 95 and 94 are connected together and to the negative line 13 of the D.-C. power supply. The remaining contacts of the sets of contacts 94 and 95 are connected to the lines leading to the armature of the reversible motor 91. With this arrangement it will be apparent that when the balanced relay 18 is in the center position, bridging members 98 and 99 close contacts 94 and 95 so that the armature of rotor 91 is shorted and will therefore be inactive. When the balanced relay 18 moves to the clockwise position, bridging member 98 moves to the left closing contacts 97, and bridging member 99 continues to close contacts 95. This operation connects the power supply lines 12 and 13 to the armature of motor 91 so that it rotates in a direction which will be assumed to be forward. On the other hand, when the balanced relay 18 moves to the counterclockwise position, bridging member 99 opens contacts 95 and closes contacts 96 while bridging member 98 continues to close contacts 94. In this condition the power supply lines 12 and 13 are connected to the motor 91 in the reverse sense so that the motor rotates backward. It will be apparent that by properly selecting the direction of the rotation of the motor 91 relative to the direction of movement of the balanced relay 18 and the polarity of the voltage output of the rotor of the course-setter selsyn 68, the system will operate as a null-seeking system whereby the amplifier is maintained in a balanced condition regardless of the relative positions of the rotor and stator of the selsyn 67 the rotor being actuated by the directional gyro 4. Therefore the servo amplifier 34 will remain balanced regardless of the azimuth heading of the airplane so long as the synchronizing system remains in operation. It will be noted that when the engaging relay 32 is energized, the bridging members 101, 103 and 105 move upwardly, opening contacts 100, 102, and 104, thereby disconnecting the motor 91 from the contact controlled by the balanced relay 18 and rendering the rudder synchronizing system inactive.

Automatic synchronization of the aileron control channel is obtained by introducing a trim signal into the aileron signal circuit having a magnitude and polarity such that the resultant signal voltage applied to the input terminals 35' and 36' of the aileron servo amplifier 34' is reduced to zero, whereupon the amplifier becomes balanced. The balanced relay 18' which controls the aileron servomotor is also used as the means responsive to an unbalanced condition of the servo amplifier for varying the output of the bank-trim signal generator in a manner which will now be described.

The bank-trim signal generator, the details of which are shown in Fig. 6 of the drawing, is essentially an electronic device for converting a D.-C. input signal to an A.-C. output signal. The device is so constructed that the A.-C. output signal is zero when the D.-C. input signal has some definite balance value other than zero, such for example as six volts. As the D.-C. input signal is increased, an alternating voltage appears across the output which is in phase with the A.-C. supply voltage 42, 43, and when the D.-C. input signal is less than six volts, an alternating voltage appears across the output which is 180 degrees out of phase with A.-C. supply source 42, 43. Thus, within saturation limits of the device, the A.-C. output signal varies in magnitude in accordance with the departure of the D.-C. input signal from the balance value, such as six volts, and the polarity of the A.-C. output signal varies in accordance with the direction of the departure. This relationship is clearly shown by the curve shown in Fig. 7 of the drawing.

The trim signal generator or converter unit is a two-stage electronic device comprising two triode electron tubes 110 and 111. While the tubes 110 and 111 are shown as enclosed in separate envelopes, they may be combined in one envelope to save space if desired. The plate of the tube 110 is connected to the positive line 45 of the B power supply through a suitable plate load resistor 112. The cathode return circuit is completed through the negative grounded line of the B power supply through a resistance 113 and an adjustable biasing potentiometer 114. An A.-C. grid-to-cathode voltage swing is induced in the tube 110 by connecting a voltage-dividing network comprising the resistances 115 and 113 to the A.-C. supply lines 42, 43. Since the resistor 113 is in the cathode return circuit of the tube 110, there will be an A.-C. voltage introduced into the plate circuit having the same frequency as the A.-C. supply voltage 42, 43. The tube 110 is operated on the curved or variable "mu" portion of the characteristic grid voltage-plate current curve of the tube, so that the A.-C. output may be varied in accordance with the magnitude of the D.-C. potential applied to the grid. Thus referring to the curve shown in Fig. 8 of the drawing, the tube is operated within a range of grid voltages corresponding to the curved or variable "mu" portion of the $e_g$—$I_p$ curve indicated by the letter A. It will be noted that if the D.-C. potential of the grid is some value $e_{g1}$, the alternating voltage swing induced between the grid and the cathode produces a relatively small alternating plate current $I_{p1}$. If the D.-C. potential of the grid is increased to some value $e_{g2}$, it will be noted that the A.-C. plate output $I_{p2}$ increases considerably in magnitude. Thus, by varying the D.-C. potential applied to the grid of tube 110, the A.-C. output voltage can be varied.

The plate of tube 111 is connected to the B+ line 45 through a suitable plate load resistor 116 and the cathode return circuit is completed through a resistor 117. A voltage-dividing network comprising a resistor 118 and the cathode resistor 117 is connected across the A.-C. supply line 42, 43 so that the voltage between the cathode and the grid of tube 111 tends to vary the frequency of the A.-C. supply and thereby cause an alternating current in the output of tube 111. The plate of tube 110 is connected to the grid of the tube 111 through a suitable coupling capacitor 119, whereby the effective grid-to-cathode voltage impressed upon the tube 111 is then the difference between the A.-C. voltage output of the tube 110 and the voltage introduced into the cathode circuit of the tube 111 by the voltage-divider network, including the resistor 117, in the cathode return circuit. Due to the phase-inverting action of the tube 110, these two voltages are 180 degrees out of phase so that net A.-C. output of the tube 111 will vary in accordance with the A.-C. output of tube 110, which is in turn variable in accordance with the D.-C. potential applied to the grid of tube 110 as explained above. Thus at a balance value of D.-C. potential applied to the grid of tube 110, the A.-C. voltage supplied to the grid of tube 111 will be equal and opposite to that induced in the cathode return circuit of the tube 111, whereupon the A.-C. output of tube 111 will be zero. If the D.-C. potential of the grid of tube 110 is increased above the balance value, the signal voltage supplied to the grid of the tube 111 from tube 110 will predominate and there will appear an A.-C. output voltage in the plate circuit of tube 111 in phase with that of the A.-C. supply 42, 43. On the other hand, if the D.-C. potential applied to the grid of tube 110 is decreased below the balance point, the alternating voltage between the grid and cathode of tube 111 which is induced in the cathode return circuit will predominate, and the A.-C. output of tube 111 will be 180 degrees out of phase with the supply voltage 42, 43. The A.-C. output of the tube 111 is connected across a suitable loading resistor 120 through a coupling capacitor 121. An adjustable portion of the A.-C. voltage developed across the resistor 120 is connected to the A.-C. signal output terminals 106' and 107' of the trim signal generator.

Connected across the D.-C. input terminals 108' and 109' of the trim signal generator through the bias adjusting potentiometer 114, are a resistor 122 and capacitor 123. The grid of tube 110 is connected to the junction point between the capacitor 123 and the resistor 122 so that the voltage across capacitor 123 determines the D.-C. bias voltage applied to the tube 110. The resistor 122 and the capacitor 123 constitute an RC time delay network so that the voltage across the capacitor 123, and consequently the bias voltage applied to the grid 110, responds relatively slowly when the D.-C. input voltage applied to terminals 108' and 109' changes. The purpose of this time delay system will become apparent as this description proceeds.

In order to vary the A.-C. signal output of the bank-trim signal generator 86, in accordance with the position of balanced relay 18', switching means operated by the balanced relay are provided for increasing the D.-C. input signal to the bank-trim signal generator when the balanced relay is unbalanced in one direction, and for decreasing the D.-C. signal input voltage when the balanced relay is unbalanced in the opposite direction. This is accomplished by the provision of two sets of contacts 124' and 125', which are alternately bridged by bridging members 126' and 127' operatively connected to the balanced armature member 19' of the balanced relay member 18'. Circuit connections are provided such that when the balanced relay 18' rotates to the counterclockwise position, bridging member 126' closes contacts 124', whereupon a D.-C. voltage derived from a resistor 128' connected across the D.-C. power supply lines 12 and 13 is applied to the input terminals 108' and 109' of the bank-trim signal generator through a circuit including contacts 129' which are normally closed by a bridging member 130' operated by the engaging relay 32. If it is assumed that some balance voltage, such as six volts, applied to the input terminals of the bank-trim signal generator corresponds to the zero A.-C. signal output, then the voltage applied to the D.-C. input signal circuit upon a closure of contacts 124' by bridging member 126' is selected to be some value greater than six volts, such as for example twelve volts. Thus, when the balanced relay 18' rotates to the counterclockwise position, the A.-C. signal output of the bank-trim signal generator will increase, the signal having a polarity which is in phase with the source voltage 42 and 43. The change in A.-C. signal output of the bank-trim signal generator is, however, relatively slow due to the time-delay action of the RC network previously described.

On the other hand, if the balanced relay 18' rotates in a clockwise direction, whereupon bridging member 127' closes contacts 125' the input terminals 108' and 109' of the bank-trim signal generator are shorted and the condenser 123 of the time delay network then is gradually discharged so that the D.-C. voltage applied to the grid of tube 110 is gradually lowered. If the balanced relay remains in a clockwise, rotated position for a sufficiently long period of time, the A.-C. signal output of the bank-trim signal generator will be reduced to zero and will thereafter begin to increase again, but with an opposite polarity, i. e., 180 degrees out of phase with the source voltage 42, 43.

In view of the foregoing it will be apparent that by properly selecting the polarity of the output of the bank-trim signal generator, the input signals of the aileron servo amplifier can be reduced to zero, and the amplifier rebalanced in response to an unbalanced condition of either sense as indicated by movement of the balanced current relay 18' to either the clockwise or counterclockwise rotated position, whereupon automatic synchronization of the aileron control channel is obtained.

Automatic synchronization in the elevator control channel is accomplished in the same manner as in the aileron control channel previously described, the pitch-trim signal generator 90 being controlled in accordance with the position of the balanced relay 18" which also controls the elevator servomotor. Therefore, corresponding parts have been given the same reference numerals except those relating to the elevator channel automatic synchronization have been double-primed to distinguish them from the aileron channel. Since the pitch-trim signal generator is identical in construction to the bank-trim signal generator 86, its operation will be clear in view of the foregoing description of the bank-trim signal generator. It will also be clear that upward movement of the switching members 130' and 130" in response to energization of the engaging relay 32 will operate to disable the synchronizing systems in both the aileron and elevator control channels, by rendering the trim signal generators 86 and 90 unresponsive to movements of the balanced current relays 18' and 18" from the center position.

The automatic synchronization of the three control channels just described takes place automatically when the control switch 8 is in the center or synchronization position. In this position a rotating contact 131 on the control switch engages a stationary contact 132 to complete a D.-C. energizing circuit to the energizing winding 133 of a power relay 134. Energization of the power relay 134 closes associated contacts 135, 136 and 137 to complete the various power supply leads to suitable sources of power supply external to the automatic pilot system. After synchronization has taken place, the control switch 8 is rotated to the clockwise position or engaging position in which rotary switch 131 engages the stationary contact 138 to complete an energizing circuit to the engaging relay 32. Also, in this position the power relay is maintained energized by engagement of the contact 131 with an additional contact 132' as will be clear by reference to the drawing. When the engaging relay is energized, bridging members 103 and 105 move upwardly, opening contacts 102 and 104 and thereby disconnecting the reversible motor 91 from the control contacts operated by the balanced relay 18. At the same time bridging members 130' and 130" move upwardly, opening contacts 129' and 129", disconnecting the input signal circuits of the bank and pitch-trim signal generators 86 and 90 from the circuits controlled by the aileron balanced relay 18' and the elevator balanced relay 18". Thus it will be seen that energization of the engaging relay 32 by movement of the control switch 8 to the engaging position disconnects the automatic synchronizing means in all three control channels. Energization of the engaging relay 32 also closes interlock switch 30, whereupon the rudder, aileron and elevator servomotors are rendered active to be controlled in accordance with movements of the rudder, aileron and elevator balanced current relays 18, 18' and 18", as has been previously described. The automatic pilot system is therefore placed in operation to stabilize the aircraft about the three control axes.

Assuming that the automatic pilot has been placed in operation by movement of the control switch 8 to the engaging position, consideration will now be given to the manner in which coordinated turns to the right and left are made in response to movements of the turn controller 6 and to the manner in which changes in pitch attitude are accomplished in response to movements of the pitch controller 7.

The armature of the reversible motor 91 is connected to the center tap and wiper of a center-tapped potentiometer 141, the resistance element of which is connected across the D.-C. supply lines 12 and 13. The wiper of the potentiometer 141 is connected to be driven by the turn controller shaft 140 in such a way that the voltage applied to the armature of the motor 91, and consequently its speed, is varied in accordance with the amount of displacement of the turn controller from the neutral position; and the polarity of the voltage supplied to the motor 91 varies in accordance with the direction of displacement of the turn controller shaft from the neutral position. It will be noted that the armature of the motor 91 is connected to the potentiometer 141 through a circuit which includes contacts 142 and 143 of the engaging relay 32. These contacts are normally open, but when the engaging relay 32 is energized in response to movement of the control switch 8 to the engaging position, bridging members 105 and 144 move upwardly so that control of the reversible motor 91 is transferred from the automatic synchronizing system of the rudder channel to the turn controller.

The speed at which the aircraft turns in azimuth is determined by the speed at which the rotor of the course-setter selsyn 68 is rotated, which in turn depends upon the displacement of the turn controller from the neutral or straight flight position. The reason for this is the fact that as the airplane turns in response to a movement of the rotor of the course-setter selsyn 68, there is a corresponding angular movement between the rotor and stator of the selsyn 67 since the rotor of the selsyn 67 is maintained fixed in space by its coupling to the directional gyro 4. The system is in effect, therefore, a follow-up system in which the course-setter selsyn 68 is a transmitter and the selsyn 67 a receiver, the rotation of the aircraft about the turn axis being the controlled element. Obviously, an equivalent result could be obtained by driving the stator of the selsyn 67 relative to the gyro case by the motor 91. The illustrated arrangement, however, in which the course-setting is accomplished by driving the course-setter, has the advantage that the reversible motor 91 may be located remotely from the directional gyro which is usually advantageous because of the fact that the available space adjacent gyro control and indicating instruments is generally very limited.

For the purpose of coordinating the angle of bank of the aircraft with the rate of turn, as determined by the position of the turn controller, the rotor of the bank-setter selsyn 83 is coupled directly to the shaft 140 of the turn controller. Rotation of the rotor of the bank-setter 83 by the turn controller displaces the zero voltage or null point, resulting in a signal which causes the airplane to bank until the voltage applied to the input of the aileron servo amplifier is reduced to zero by relative rotation between the rotor and stator of the selsyn 82 actuated by the vertical gyro 5. By properly coordinating the rate of turn of the aircraft with the angular displacement of the shaft 140, a banking of the aircraft can be obtained which is approximately correct for some average flying speed. However, for flying speeds other than this average speed, the banking angle will not be correct because the proper banking angle depends not only upon the rate of turn of the aircraft, but also upon its speed.

The correct banking angle is obtained when the vertical axis of the aircraft in a turn coincides with apparent vertical, i. e., the resultant of the gravitational and centrifugal acceleration forces. In order to provide a means for indicating departure of the aircraft from the proper banking angle in a turn, there is provided a pendulum 145 which is mounted for rotation about an axis DD, which is parallel to or coincident with the longitudinal axis of the aircraft. In order to correct the bank angle of the aircraft in a turn in response to a deflection of the pendulum 145 from alignment with the vertical axis of the aircraft, means are provided for varying the output of the bank-trim signal generator 86 is response to a deflection of the pendulum whereupon the angle of bank of the aircraft is changed in a direction to restore the pendulum to the center position. This is accomplished by the provision of switching means operated by the pendulum which operate to connect a D.-C. voltage greater than the balance voltage of the input terminals of the bank-trim signal generator when the pendulum deflects in one direction and apply a voltage less than the balance voltage to the input terminals when the pendulum deflects in the opposite direction. The switching means comprises a movable contact 146 carried by the pendulum, and a pair of spaced stationary contacts 147 and 148 which are arranged to be alternately engaged by the contact 146 in response to a deflection of the pendulum to the right or left. The stationary contact 148 is connected to a D.-C. voltage which has a value greater than the balance voltage for the bank-trim signal generator, which, for example, might be twelve volts if the balance voltage is assumed to be six volts. This voltage is obtained from a voltage-dividing network comprising serially connected resistors 149a and 149b, which are connected across the D.-C. power supply lines 12 and 13. Resistors 149a and 149b are selected so that the voltage at their junction point to which the contact 148 is connected, has the desired value. The other stationary contact 147 is connected to the negative D.-C. supply line 13, as shown. The center contact 146 of the pendulum-control switching means is electrically connected to the input terminal 108' of the bank-trim signal generator by a circuit including contacts 150, which are closed by a bridging member 151 when the engaging relay 32 is energized. Thus when the control switch 8 is moved from the synchronizing to the engaging position, the control of the bank-trim signal generator is transferred from the balanced relay 18' to the pendulum 145. It will be apparent that if the pendulum deflects to the right, causing engagement of contacts 146 and 148, the D.-C. voltage applied to the input terminals of the bank-trim signal generator will increase, causing a change in the A.-C. output in one direction. On the other hand, if the pendulum deflects to the left, causing engagement of contacts 146 and 147, the input terminals 108' and 109' of the bank-trim signal generator will be shorted so that the applied signal voltage will decrease, whereupon the A.-C. signal output voltage will vary in the opposite direction. However, due to the fact that it takes considerable time to change the charge across capacitor 123 in the trim signal generator, the A.-C. signal voltage output of the trim signal generator will vary relatively slowly. This is a desirable condition because in this manner oscillations of the pendulum 145 are integrated, and the A.-C. signal output of the trim signal generator is varied in accordance with the average pendulum position. Since the introduction of a trim signal voltage in the aileron signal circuit will result in a change in the banking attitude of the aircraft, it is evident that by properly selecting the polarity of the trim signal relative to the direction of displacement of the pendulum from the center position, the bank angle can be trimmed during a turn in a direction to restore the pendulum 145 to the center position which it will occupy when the aircraft is banked at the proper angle.

When the automatic pilot is in operation, changes in pitch attitude are effected by adjustment of the pitch controller 7. The pitch controller comprises an adjusting knob 153 connected to rotate a shaft 154, which is directly coupled to the wiper of a potentiometer 155. The resistance element of the potentiometer 155 is connected across the D.-C. supply lines 12 and 13. An adjustable portion of the voltage drop across the resistance element, as varied by the position of the wiper, is supplied to the input terminals 108' and 109' of the pitch-trim signal generator through a circuit including contacts 156, which are closed by a bridging member 130' when the engaging relay 32 is energized. Thus when the engaging relay 32 is energized to place the automatic pilot in operation, contacts 129' are opened and contacts 156 are closed by the upward movement of bridging members 130' so that the control of the pitch trim signal generator 90 is transferred from the balanced relay 18' to the pitch controller 7. By adjusting the knob 153 of the pitch controller, the D.-C. voltage applied to the input of the pitch-trim signal generator, the A.-C. output voltage of the pitch-trim signal generator and consequently the pitch attitude of the aircraft may be changed as desired. Since there is a fixed relationship between the trim signal voltage introduced in the elevator signal circuit by the pitch-trim signal generator and the D.-C. voltage applied to the input of the pitch-trim signal generator, there will also be a fixed relationship between the pitch attitude of the aircraft and the position of the knob 153 of the pitch controller. This fixed relationship is desirable because it enables the pilot to tell by the physical position of the knob 153, the approximate stabilized pitch attitude of the aircraft.

It is important to note that at the time the engaging relay 32 is energized to transfer the control of the pitch-trim signal generaor from the balanced current relay 18" to the pitch controller, the net voltage applied to the input terminals 108" and 109" of the pitch-trim signal generator by the balanced relay 18" may be different from the voltage supplied by the potentiometer 155. If this is the case, the output signal voltage of the pitch-trim signal generator 90, and consequently the pitch attitude of the aircraft, will change from the position occupied at the time of synchronization to the position called for by the adjustment of the knob 153 of the pitch controller. This change in pitch attitude of the aircraft will be made relatively slowly, however, due to the fact that it takes considerable time to change the charge across the capacitor 123 in the pitch-trim signal generator. With this arrangement the human pilot can set the desired pitch attitude of the aircraft, prior to engaging the pilot, by adjusting knob 153, and after the automatic pilot is engaged the pitch attitude of the aircraft will slowly change to the preset position of the pitch controller.

For the purpose of enabling the aircraft to be maneuvered from stations remote from the location of the turn controller 6, there is provided a reversible motor 157 which is coupled to the shaft 149 of the turn controller through a suitable gear reduction 158. Jogging switches 159 are located at remote stations and connected as shown so that the direction of rotation of the reversible motor 157, and consequently the direction of rotation of the turn controller 6 can be controlled by actuating the jogging switch to obtain the desired direction of rotation of the turn controller. A selector switch 160 is provided by means of which the human pilot can disconnect the remote control or switch it to the desired remote station.

When the turn controller 6 is actuated by the reversible motor 157, the speed of rotation of the turn controller, and consequently the rate of change of turning rate of the aircraft, may be maintained at some safe value by suitably selecting the motor speed and the gear reduction 158. However, when the turn controller 6 is actuated manually by the pilot, there is a possibility that the turn controller might be inadvertently actuated too rapidly so as to cause a sudden, and possibly dangerous, movement of the aircraft and it is desirable to provide some means for limiting the maximum speed of rotation of the turn controller shaft 140. In the illustrated arrangement this is accomplished by the provision of an inertia governor comprising a flywheel 161, which is coupled to the shaft 140 by suitable step-up gearing indicated at 162. Obviously an escapement mechanism, a dash-pot, or other suitable speed-limiting means could equally well be used.

As mentioned above, the selsyn 78 is provided for introducing a voltage into the rudder signal circuit to correct for gimbal error. The cause of gimbal error and the manner in which it is compensated in accordance with the present invention will now be explained.

Gimbal error arises from the interaction of the gimbals of the directional gyro 4 whenever the axis AA of the vertical gimbal ring 66 becomes inclined to the vertical when the aircraft is banked, as in the case when a banked turn is being made. The gimbals of the directional gyro constitute a linkage which is the equivalent of a Hooke's or Cardans' universal coupling, and the gimbal error is the same effect that is found in a universal coupling when the input and output shafts are inclined at an angle to each other.

The analogy between the directional gyro and a universal coupling or joint can be more easily seen by reference to Fig. 9 of the drawing. Referring to Fig. 9, the directional gyro 4 is represented, as in Fig. 1a, as comprising a rotor 64 mounted in the horizontal gimbal ring 65, which is pivoted on the outer gimbal ring 66. The axis VV which is normal to the spin axis of the gyro represents true vertical, and the axis AA of the gimbal 66 is shown inclined at an angle $a$, as in the case when the aircraft is banked relative to the horizontal at an angle $a$.

Normally the orientation of the spin axis of the rotor remains fixed in space while the case of the gyro and the aircraft rotate around it. However, for the purpose of explaining gimbal error by analogy to the universal coupling, it is more convenient to assume an equivalent situation in which the case of the gyro is held fixed and the spin axis of the gyro is rotated. To further clarify the situation for explanatory purposes, a yoke 163 is coupled to the gimbal 65 by trunnions 164 to represent a means by which the spin axis of the rotor could be rotated about the vertical axis VV. It will now be seen that the linkage constitutes a conventional Hooke's or Cardans' universal joint in which a shaft 165 coupled to the yoke 163 for rotation about the axis VV constitutes the input, and a shaft 156 coupled to the gimbal 66 for rotation about the axis AA is the output. It will also be seen that the angle $\alpha$ represents the angle between the axes of the input and output shafts. If $\theta$ represents an angular displacement of the input shaft 165, $\phi$ represents the resulting angle displacement of the output shaft 166, and $\alpha$ represents the angle between the axes of shafts 165 and 166, then, by a well known mathematical derivation, such as given on page 273 of "Mechanism and the Kinematics of Machines" by W. Steeds, the relationship between $\theta$ and $\phi$ is given by the following equation (1) $\qquad \tan \theta = \tan \phi \cos \alpha$ From an inspection of the above equation, it is clear that for any value of $\alpha$ other than zero, the input shaft 165 and the output shaft 166 do not remain in angular correspondence as shaft 165 is rotated through 360 degrees. It is the difference between the angular positions of shafts 165 and 166, or $\theta - \phi$, that gives rise to an erroneous azimuth indication of the directional gyro when the aircraft is banked, this error having been termed gimbal error.

Gimbal error appears as a voltage error in the rudder signal system due to the fact that the rotor of the signal generator selsyn 67 is coupled to the output shaft 166 and if uncompensated for this voltage error causes an undesirable cycle variation in the rate of turn when the aircraft is maneuvered in a banked turn by displacement of the turn controller 6 from the neutral, straight-flight position. This can be seen by reference to the vector diagram shown in Fig. 10 of the drawing. Referring to Fig. 10, the vector $V_R$ represents the magnetic axis of the rotor of the course-setter selsyn 68 while the vector $V_s$ represents the direction of the resultant magnetic field produced by the two stator windings of selsyn 68. Due to the cascade coupling between the selsyns 67 and 68, the vector $V_s$ also represents the relative position between the rotor and stator, of the selsyn 67, and hence the position of shaft 166 relative to the gyro case and the aircraft. When the turn controller 6 is displaced from neutral, the motor 91 drives the rotor of the course-setter selsyn 68 so that the vector $V_s$ rotates in a direction which will be assumed to be clockwise. The vectors $V_R$ and $V_s$, which are normally coincident corresponding to zero voltage output of the course-setter selsyn 68, then become displaced so that a voltage $e_s$ proportional to the vector difference $V_D$ is produced which causes a corresponding proportional displacement of the rudder. Displacement of the rudder causes the aircraft to turn so that the vector $V_s$ follows vector $V_R$ with a phase lag proportional to the amount of rudder required for the desired rate of turn. Due to the gimbal error mentioned above, the vector $V_s$ does not represent the true azimuth position of the aircraft as measured relative to the spin axis of the directional gyro, but is subject to an error $\theta - \phi$. Thus, for example, this error may cause the vector $V_s$ to advance to some position $V_{s1}$, whereupon the vector difference $V_{D1}$ and the resultant voltage $e_{s1}$ are reduced in value. On the other hand, the error may cause the vector $V_s$ to lag in some position $V_{s2}$, whereupon the difference vector $V_{D2}$ and the resultant voltage $e_{s2}$ are increased in value. As the aircraft rotates in azimuth, the voltage $e_s$ varies cyclically between a maximum value $e_{s1}$ and a minimum value $e_{s2}$, as represented by the curve shown in Fig. 11 of the drawing. This cyclic variation in the voltage $e_s$, which varies as a function of $\theta - \phi$, as given by the above equation, tends to cause a similar cyclic variation in the displacement of the rudder, and consequently the rate of turn of the aircraft.

According to the present invention, the output of the course-setter selsyn 78 is modified to cancel out the cyclic voltage variation due to gimbal error so that it does not appear in the resultant signal fed to the rudder servo amplifier. This is accomplished in the embodiment of the invention thus far described by varying the output of the gimbal error selsyn 78 so that it varies with the same frequency and magnitude as the gimbal error voltage, but is in phase opposition as indicated by the curve $e_c$ of Fig. 11. Theferore, the resultant voltage $e_R$ fed to the rudder servo amplifier is free from the undesired gimbal error fluctuation. The manner in which the output voltage of the gimbal error selsyn 78 is varied to obtain the relationship indicated by the curve $e_c$ now will be described.

It can be shown by plotting that the gimbal error voltage curve $e_s$ is closely approximated by the curve defined by the following equation:

(2) $\qquad \theta - \phi K\alpha^2 \sin 2\theta$ where $\theta$, $\phi$ and $\alpha$ represent the same quantities as in Equation 1, and K is constant of proportionality. It will be noted that Equation 2 represents a sine curve having a frequency of $2\theta$ or twice the frequency of $\theta$, the azimuth rotation of the aircraft, and having a magnitude proportional to $\alpha^2$, the square of the angle of bank of the aircraft. The output of the selsyn 78 varies sinusoidally as the rotor is rotated, as indicated by the relationship shown in Fig. 5 of the drawing. Since $\theta$ is represented by the position of the rotor of the course-setter selsyn 68, a function of $2\theta$ can be obtained by driving the rotor of selsyn 78 at twice the speed of the rotor of selsyn 68. This is accomplished by driving the rotor of selsyn 78 from the same shaft that drives the shaft or rotor of selsyn 68 through a 2:1 gear step-up drive indicated at 167.

In order to vary the maximum voltage output of selsyn 78 in accordance with the square of the angle of bank, the rotor excitation is controlled by means of two cascade-connected, center-tapped potentiometers 168 and 169. The resistance element of potentiometer 169 is connected to the A.-C. supply lines 42 and 43 while the resistance element of potentiometer 168 is connected to the center tap and wiper of potentiometer 169. The wipers of both potentiometers are mechanically coupled to the turn controller shaft 140, as indicated by the dotted lines 168a and 169a, so as to occupy the center of zero voltage position when the shaft 140 is in the center position corresponding to straight and level flight. It will be evident that with this arrangement the excitation of the rotor of selsyn 78, and consequently the maximum A.-C. voltage output, will vary in accordance with the square of the angular displacement of the shaft 140 from neutral. Since the shaft 140 also controls the bank setter selsyn 83 as previously described, the angular position of the shaft also indicates approximately the angle of bank of the aircraft. Therefore, the excitation of selsyn 78, and consequently its maximum voltage value, corresponds approximately to the square of the angle of bank which is the desired condition, as pointed out above.

By properly correlating the selsyns 67, 68 and 78 with the spin axis of the directional gyro 4, it will be apparent that the phase relationship of the correction voltage curve ec can be made opposite to the gimbal error voltage es, whereby the desired cancellation of the gimbal error voltage es is obtained.

In view of the foregoing description, it is believed that the operation of the automatic pilot control system should now be clear. However, by way of a brief resume, it may be stated that when the control switch 8 is in the "off" or counterclockwise position, the power relay 134 is deenergized and all electrical components of the system are disconnected from their sources of power supply so that the entire autopilot system is inactive.

If it is now desired to use the automatic pilot, the control switch 8 is rotated to the "center" or synchronizing position in which power relay 134 is energized, supplying power to the various electrical components. In this position, however, circuits are completed to render the automatic synchronization operative in each of the three control channels, and in addition the interlock switch 30 is open so that the rudder, aileron and elevator servomotors are disabled. In the rudder channel, automatic synchronization is obtained by the action of the rudder-balanced relay 18 which, in response to the unbalance of the rudder servo amplifier 34, causes motor 91 to drive the course-setter selsyn 68 into a position in which the balance of the servo amplifier is restored. Automatic synchronization of the aileron and elevator channels is accomplished by controlling the output of the bank-trim signal generator 86 and pitch-trim signal generator 90 in accordance with the positions of aileron balanced relay 18' and elevator balanced relay 18" so as to vary the output of the trim-signal generators and restore the balance of the aileron and elevator servo amplifiers 34' and 34". After automatic synchronization of the three control channels to the instant attitude of the aircraft about the three control axes, the automatic pilot system is ready for engagement and the control switch 8 is rotated to the clockwise or engaging position. In this position the power relay remains energized and the engaging relay 32 is energized to close interlock switch 30, which renders the three servomotors active to control the rudder, aileron and elevators 1, 2 and 3, whereupon the aircraft is stabilized, the three control channels responding to displacement of the aircraft about the turn, pitch and bank axes as measured by the directional gyro 4 and the vertical gyro 5. Energization of the engaging relay 32 operates contacts to disable the automatic synchronizing means of the three control channels and to transfer the control circuits of the reversible motor 91, the bank-trim signal generator 86, and the pitch-trim signal generator 90. Thus the control of reversible motor 91 is transferred to the speed control potentiometer 141 operated by the turn controller 6 to permit turns to be made dependent upon the direction and amount of displacement of the turn controller 6 from the straight and level flight or neutral position. The bank setter 83 is also displaced in response to movement of the turn controller 6 so that the approximate angle of bank corresponding to the rate of turn is introduced into the control system. The operation of engaging relays 32 also transfers the control of the bank-trim signal generator 86 to the pendulum 145 so that the bank angle is trimmed or corrected in response to a departure of the bank of the aircraft from the correct position, as indicated by deflection of the pendulum 145. Operation of the relay 32 also transfers the control of the pitch-trim signal generator 90 to the pitch controller 7 so that the pitch attitude of the aircraft may be adjusted in accordance with the pitch controller. If the pitch attitude of the aircraft at the time of synchronization is different from the pitch attitude called for by the pitch controller 7 at the time the automatic pilot is engaged, the pitch attitude of the aircraft will gradually change to the attitude called for by the position of the pitch controller due to the time delay action of the RC network comprising the resistor 122 and the capacitor 123 in the trim-signal generator.

As the airplane turns in response to a displacement of the turn controller 6, the rotor of the gimbal error selsyn 78 rotates at twice the speed of the course setter, and the excitation of the rotor varies in accordance with the square of the angle of the bank as measured by the position of turn controller shaft 140 which controls the position of the excitation control potentiometers 168 and 169, whereupon a cyclic correction voltage is introduced into the rudder signal circuit which compensates for gimbal error.

Normally, the human pilot adjusts the turn of the aircraft by manually operating the turn controller 6. However, if he desires to switch the turn control of the aircraft to a remote station, he may do so by operating the selector switch 160 which transfers control of the turn controller drive motor 157 to remote stations, at which are located the jogging control switches 159.

Thus it will be seen that there is provided an automatic pilot control system in which the automatic synchronization of the three control channels is obtained simply by moving a control switch to a synchronizing position prior to movement of the switch to an engaging position in which the entire system is rendered active to stabilize the aircraft about the three control axes. Furthermore, coordinated turns to the right and left in which the angle of bank is maintained correct at all air speeds automatically is accomplished by a simple adjustment of the manually operated turn controller, the pitch attitude being adjustable either during straight flight or in turn by an additional adjustment of the pitch controller.

The time delay action in transferring the attitude of the aircraft from the position occupied at the time of synchronization to a preset position called for by a manually operated controller is a great advantage in operating the automatic pilot because it insures that engagement of the pilot will be accomplished smoothly while at the same time a predetermined relationship will be maintained between the position of the controller and the attitude of the aircraft, which is very desirable. This arrangement is also a great advantage in engaging the automatic pilot in rough air because if at the instant of synchronization the attitude of the aircraft should change suddenly, due to an air bump, the attitude of the aircraft will be restored to the desired position slowly and smoothly after engagement of the automatic pilot without any complicated coordination on the part of the human pilot. In the illustrated embodiment of the invention, this time delay or "pull-in" action is shown only in connection with the elevator control channel where it is particularly desirable. It should be understood, however, that it may equally be applied to the other two control axes without departing from our invention.

With reference to gimbal error correction, it should be understood that the invention will operate equally well in a case where the reversible motor 91 operates to change the course of the aircraft by driving the stator of the selsyn signal generator 67 directly instead of remotely through the course-setter 68 as shown, as obviously these two arrangements are fully equivalent as far as operation of the gimbal error correction is involved.

In Fig. 12 of the drawing there is shown a modified arrangement for correcting for gimbal error. With this arrangement it is unnecessary to use the gimbal error selsyn 78, its associated gearing 92 and 167, and control potentiometers 168 and 169, and in place of these items there is substituted a universal joint in the drive between the reversible motor 91 and the rotor of the course-setter selsyn 68. With this arrangement a cyclic mechanical oscillation is superimposed upon the drive of the course motor rotor in such a way that cyclic variations of the vector Vs (Fig. 10), caused by gimbal error, are accompanied by corresponding cyclic variations in the position of vector $V_R$, whereupon the difference vector $V_D$ remains constant and is unaffected by gimbal error. Thus for example if the vector Vs is advanced to a position $V_{S1}$ due to gimbal error of the directional gyro, the vector $V_R$ is advanced correspondingly to a position $V_{R'}$ so that the vector difference $V_{D'}$, and consequently the resulting course-setter selsyn voltage, remains the same as the vector difference $V_D$. The operation of the device is based upon the fact that since gimbal error in the directional gyro arises in the first instance by an angular displacement equal to the angle of bank of the axes of input and output shafts constituting a universal joint, the gimbal error effect can be duplicated and used for compensation by the provision of a second universal joint in the drive between the motor 91 and the course-setter 68, in which the angle between the axes of the input and output shafts is also varied in accordance with the angle of bank.

In the illustrated arrangement, the universal joint interposed between the reversible motor 91 and the course-setter 68 comprises a forked member 170, comprising two sets of arms extending at right angles to each other, one set being pivotally connected to a yoke member 171 and the other set being pivotally connected to the second yoke member 172. The yoke member 170 is connected to an input shaft 173, mounted for rotation about an axis EE, while the yoke member 172 is connected to an output shaft 174 which is mounted for rotation about an axis FF. The output shaft 174 is coupled directly to the rotor of the course-setter selsyn 68, while the input shaft 173 is coupled to the reversible motor 91 through a speed-reducing gear train comprising a gear 175 mounted on input shaft 173, a coacting worm gear 176, a spur gear 178 connected to the worm 176 through a shaft 177, a spur gear 179 driving gear 178, and a shaft 180 coupling gear 179 with the reversible motor 91.

Mounted for rotation about an axis GG, which is coaxial with the shaft 180 and which passes through the center of the forked member 170 is a U-shaped supporting member 181. The shafts 173 and 177 are journalled for rotation in bearings carried by the U-shaped member 181 so that the entire assembly comprising the shafts 173 and 177, the gears 175, 176 and 178, and the U-shaped member 181 may be rotated as a unit about the axis GG. Thus by rotating U-shaped member 181, the axis of the input shaft EE may be disposed at an angle to the output shaft FF.

In order to adjust the angle between the input shaft 173 and the output shaft 174 in accordance with the angle of bank of the aircraft and thereby introduce the desired gimbal error correction, means are provided for rotating the U-shaped member 181 in accordance with the angular position of the shaft 140 of the turn controller 6. This is accomplished by connecting a shaft 182, coupled to the U-shaped member 181, to the shaft 140 by means of an interconnecting shaft 183 and two sets of bevel gears 184 and 185. The bevel gears 184 and 185 have a 1:1 ratio so that the shaft 182, coupled to the U-shaped member 181, which is coaxial with the axis of rotation GG, is rotated the same angular amount as the turn controller shaft 140 in response to a movement of the turn controller 6. Therefore as the airplane is banked in response to a movement of the turn controller 6, the angle between the input and output shafts 173 and 174 of the universal coupling is changed an amount corresponding to the angle of bank and the desired gimbal error correction obtained as explained above.

It will be noted that in both modifications gimbal error correction is obtained by modifying the electrical output of electrical signal generating means actuated by the directional gyro in accordance with the azimuth position of the aircraft relative to the spin axis of the directional gyro, and in accordance with the angle of bank of the aircraft.

While we have shown and described particular embodiments of our invention, it will occur to those skilled in the art that various changes and modifications may be made without departing from our invention and we therefore aim in the appended claims to cover all such changes and modifications as fall within the true spirit and scope of our invention.

What we claim as new and desire to secure by Letters Patent of the United States is:

1. In an automatic steering device for aircraft, an azimuth position-maintaining means, said position-maintaining means being subject to an error dependent upon the azimuth position and angle of bank of said aircraft, a signal generator actuated by said position-maintaining means, means for modifying the output signal of said signal generator in accordance with the azimuth position and angle of bank of said aircraft to correct for said error, and means for controlling the rudder of said aircraft in accordance with said output signal.

2. In an automatic pilot for aircraft, a directional gyro having a gimbal ring which is normally vertical but which becomes inclined when said aircraft is banked so that the orientation of said gimbal ring about its axis does not correspond exactly with the orientation of the gyro spin axis for various azimuth positions of said aircraft giving rise to a gimbal error, a first signal generator coupled to said gimbal ring for producing a signal corresponding to the displacement of said gimbal ring about its axis, said signal giving an erroneous azimuth indication due to said gimbal error, a second signal generator, means for actuating said second signal generator so as to produce a signal variable in accordance with the magnitude of said gimbal error, means for comparing the outputs of said first and second signal generators to obtain a resulting signal free from said gimbal error and thereby representing the true position of said aircraft relative to said spin axis of said directional gyro, and means for controlling the rudder of said aircraft in accordance with said output signal.

3. In an automatic pilot for aircraft, a directional gyro, a signal generator actuated by said directional gyro for producing a first signal variable in accordance with the displacement of said aircraft about its turn axis, said signal being subject to a gimbal error due to inclination of the vertical gimbal ring of said directional gyro during a banking of said aircraft, a second signal generator, means for actuating said second signal generator so as to produce a signal variable in accordance with the azimuth position and the angle of bank of said aircraft whereby the output of said second signal generator corresponds to said gimbal error, means for comparing the outputs of said first and second signal generator to obtain a resultant signal free from said gimbal error and thereby representing the true position of said aircraft relative to said spin axis of said directional gyro, and means for controlling the rudder of said aircraft in accordance with said output signal.

4. In an automatic pilot, a directional gyro, a signal generator actuated by said directional gyro for producing a signal representative of the azimuth position of said aircraft, said signal being subject to cyclic error as said aircraft rotates in azimuth due to gimbal error in said directional gyro, said error when plotted against azimuth position being represented approximately by a sine curve having twice the frequency of the azimuth rotation of the said aircraft and having a maximum amplitude proportional to the square of the angle of bank, a second signal generator having rotatable and stationary parts, the output of said second signal generator varying sinusoidally as said rotating part is rotated, means for varying the maximum value of the sinusoidal output of said second signal generator in accordance with the square of the angle of bank of said aircraft, means for driving the rotatable part of said second signal generator so that the sinusoidal output thereof has a frequency which is twice the frequency of the azimuth rotation of said aircraft whereby the output of said second signal generator represents said gimbal error, means for comparing the outputs of said first and second signal generators to obtain a resultant signal free from said gimbal error, and means for controlling the rudder of said aircraft in accordance with said output signal.

5. In an automatic pilot, a directional gyro, a signal generating means for producing a turn control signal, means for varying the output of said signal generating means in accordance with the displacement of said aircraft relative to the vertical gimbal ring of said directional gyro, said signal variation being subject to gimbal error in said directional gyro, a rotatable course setter for additionally varying the output of said signal generating means independently of said directional gyro, means for actuating the rudder of said aircraft in accordance with said turn control signal, driving means for said course setter for causing a displacement of said rudder and turning of said aircraft in azimuth, a rotatable gimbal error compensator for modifying said turn control signal, means coupled with said driving means for driving said compensator at twice the speed of said course setter, a bank setter coordinated with said course setter for adjusting the angle of bank of said aircraft in accordance with the position of said bank setter for making coordinated turns, and means for varying the output of said compensator in accordance with the position of said bank setter whereby said compensator eliminates the effect of said gimbal error which otherwise causes a cyclic variation in the rate of turn of said aircraft.

6. In an automtaic pilot for aircraft, a rotatable course setter for producing a turn control signal, a directional gyro, means actuated by said directional gyro for varying the output of said course setter to produce a displacement signal in accordance with displacement of said aircraft about its turn axis relative to said directional gyro, said displacement signal being subject to a gimbal error when said aircraft is banked due to tipping of the vertical gimbal ring of said directional gyro, driving means for rotating said course setter to cause a turning of said aircraft, said driving means including a universal joint having input and output shafts, and means for varying the angle between the input and output shafts of said universal joint in accordance with the angle of bank of said aircraft to introduce a correction in said course setter compensating for said gimbal error.

7. In an automatic pilot for stabilizing an aircraft in flight, normally balanced rudder, aileron and elevator control devices, means for unbalancing said control devices in accordance with displacement of said aircraft about the turn, bank and pitch control axes, rudder, aileron and elevator servomotor means associated with said control devices for actuating the rudder, aileron and elevator control surfaces of said aircraft in response to an unbalanced condition of said control devices whereby to stabilize the aircraft about the turn, pitch and bank axes, signal adjusting means associated with each of said rudder, aileron and elevator control devices for changing the balance of said control devices independently of the attitude of said aircraft about said control axes, means for actuating said signal-adjusting means in accordance with the output of their associated control devices for balancing said control devices to obtain automatic synchronization thereof, switching means for transferring control of said signal adjusting means from their associated control devices to a turn controller, a pitch controller, and a bank-adjusting device, and means operated by said switching means for disabling said servomotor means while signal adjusting means are synchronizing said control devices.

8. An automatic pilot for aircraft having a control surface for controlling the movement of said aircraft about a control axis comprising a control device having an output which is normally balanced but which becomes unbalanced in opposite senses in response to the character of input signals supplied thereto, a position-responsive signal generator and a trim-signal generator connected to jointly supply input signals to said control device, position-maintaining means for actuating said position-responsive signal generator, pendulum control means for varying the output of said trim-signal generator, synchronizing means responsive to the sense of unbalance of said control device for also varying the output of said trim signal generator, servomotor means responsive to the sense of unbalance of said control device for actuating said control surface, and switching means for selectively disabling said pendulum control means, said synchronizing means, and said servomotor means, said switching means having a synchronizing position in which said pendulum control means, and said servomotor means, are disabled to permit said synchronizing means to actuate said trim signal generator and thereby balance said control device, and an engaging position in which said synchronizing means is disabled to permit said servomotor means to actuate said control surface to stabilize said aircraft, and to permit said pendulum controlled means to vary the output of said trim signal generator to adjust the stabilized attitude of said aircraft.

9. An automatic pilot for aircraft having a control surface for controlling movement of said aircraft about a control axis comprising a control device having an output which is normally balanced but which becomes unbalanced in opposite senses in response to the character of input signals supplied thereto, a position responsive signal generator, a trim signal generator, means for varying the input of said control device in accordance with the output of both of said signal generators, each of said signal generators being capable of producing signals tending to unbalance said control device in either sense, means responsive to displacement of said aircraft about said control axis for varying the output of said position responsive signal generator to cause unbalance of said control device in a sense depending upon the sense of displacement, synchronizing means responsive to the sense of unbalance of said control device for varying the output of said trim signal generator in a direction to restore balance of said control device, a servomotor for actuating said control surface, servomotor control means responsive to the sense of unbalance of said control device for controlling the direction of movement of said servomotor, and switching means for selectively connecting the output of said control device first to said synchronizing means to balance said control device and subsequently to said servomotor control means for causing actuation of said servomotor and control surface in a direction to stabilize said aircraft about said control axis in a position occupied by said aircraft at the time said switching means is actuated.

10. An automatic pilot for aircraft having a control surface for controlling movement of said aircraft about a control axis comprising a control device having an output which is normally balanced but which becomes unbalanced in opposite senses in response to the character of input signal supplied thereto, a position-responsive signal generator and a trim signal generator for supplying input signals to said control device, position-maintaining means for actuating said position-responsive signal generator to cause unbalance of said control device in response to the direction of displacement of said aircraft about said control axis, synchronizing means responsive to the sense of unbalance of said control device for varying the output of said trim signal generator to restore balance of said control device independently of the position of said position-maintaining means relative to said aircraft, servomotor means responsive to the sense of unbalance of said control device for actuating said control surface, and switching means for selectively disabling said synchronizing means and said servomotor means, said switching means having a synchronizing position in which said servomotor means is disabled to permit said synchronizing means to balance said control device for the position then occupied by said aircraft and an engaging position in which said synchronizing means is disabled to permit said servomotor means to stabilize said aircraft in the position occupied thereby at the time said switching means is actuated from said synchronizing position to said engaging position.

11. An automatic pilot for aircraft having a control surface for controlling the movement of said aircraft about a control axis comprising a control device having an output which is normally balanced but which becomes unbalanced in opposite senses in response to the character of input signals supplied thereto, a signal generator for supplying input signals to said control device, position-maintaining means for actuating said signal generator to cause unbalance of said control device in a sense dependent upon the direction of displacement of said aircraft about said control axis, synchronizing means responsive to the sense of unbalance of said control device for restoring the balance of said control device independently of the position of said position-maintaining means relative to said aircraft, servomotor means responsive to the sense of unbalance of said control device for actuating said control surface, and switching means for selectively disabling said synchronizing means and said servomotor means, said switching means having a synchronizing position in which said servomotor means is disabled to permit said synchronizing means to balance said control device for the position then occupied by said aircraft, and an engaging position in which said synchronizing means is disabled to permit said servomotor means to stabilize said aircraft in a position occupied thereby at the time said switch means is actuated from the synchronizing to the engaging position.

12. An automatic pilot for aircraft having a control surface for controlling movement of said aircraft about a control axis comprising a control device having an output which is normally balanced but which becomes unbalanced in opposite senses in response to the character of an input signal supplied thereto, a position responsive signal generator and a trim signal generator connected to jointly supply input signals to said control device, position-maintaining means for actuating said position responsive signal generator, a manually operated control for varying the output of said trim signal generator, synchronizing means responsive to the sense of unbalance of said control device for also varying the output of said trim signal generator, servomotor means responsive to the sense of unbalance of said control device for actuating said control surface, and switching means for selectively disabling said manually operated control, said synchronizing means, and said servomotor means, said switching means having a synchronizing position in which said manually operated control and said servomotor means are disabled to permit said synchronizing means to actuate said trim signal generator and thereby balance said control device, and an engaging position in which said synchronizing means is disabled to permit said servomotor means to actuate said control surface to stabilize said aircraft, and to permit said manually operated control to vary the output of said trim signal generator to adjust the stabilized attitude of said aircraft.

13. In an automatic pilot for an aircraft having a control surface for controlling movement of said aircraft about a control axis, stabilizing means for actuating said control surface so as to stabilize said aircraft about said control axis, preset attitude adjusting means associated with said stabilizing means for presetting the final stabilized attitude of said aircraft prior to engagement of said stabilizing means, synchronizing means associated with said stabilizing means for adjusting the stabilized attitude of said aircraft to the instant attitude of said aircraft about said control axis prior to engagement of said stabilizing means, and means rendered operative upon engagement of said stabilizing means for gradually changing the stabilized attitude of said aircraft from the position at the time of engagement of said stabilizing means to the position called for by said preset attitude adjusting means.

14. An automatic pilot for aircraft having a control surface for controlling movement of said aircraft about a control axis comprising a control device having an output which is normally balanced but which become unbalanced in opposite senses in response to the character of an input signal supplied thereto, a position-responsive signal generator and a trim signal generator connected to jointly supply input signals to said control device, position-maintaining means for actuating said position-responsive signal generator in accordance with displacement of said aircraft about said control axis, a manually operated trim control for varying the output of said trim signal generator in accordance with the position of said trim control, synchronizing means responsive to the sense of unbalance of said control device for also varying the output of said trim signal generator, servomotor means responsive to the sense of unbalance of said control device for actuating said control surface, and switching means for selectively disabling said manually operated trim control, said synchronizing means, and said servomotor means, said switching means having a synchronizing position in which said manually operated trim control and said servomotor means are disabled whereby said synchronizing means actuates said trim signal generator to balance said control device, and an engaging position in which said synchronizing means is disabled whereby said servomotor means actuates said control surface to stabilize said aircraft, and means brought into operation by actuation of said switch means to said engaging position for restoring operation of said manual trim control by gradually varying the output of said trim signal generator, and consequently the attitude of said aircraft, from the value determined by previous operation of said synchronizing means to the value determined by the position of said manual trim control whereby to maintain a predetermined relationship between the position of said manual trim control and the stabilized attitude of said aircraft.

15. In an automatic pilot for aircraft having a control surface for moving said aircraft about a control axis, a control device having an output which is normally balanced but which becomes unbalanced in opposite senses in response to the character of input signals supplied thereto, a position-maintaining means, a signal generator actuated by said position-maintaining means, means for supplying input signals to said control device in accordance with the output of said signal generator to unbalance said control device in a sense dependent on the direction of displacement of said aircraft about said control axis, servomotor means responsive, when operative, to the sense of unbalance of said control device for actuating said control surface to stabilize said aircraft about said control axis, reversible motor means responsive, when operative, to the sense of unbalance of said control device for adjusting the input to said control device to restore balance of said control device independently of the position of said position-maintaining means relative to said aircraft, and switching means having a synchronizing position and an engaging position for selectively disabling said reversible motor means and said servomotor means, said switching means operating in said synchronizing position to disable said servomotor means whereby said reversible motor means balances said control device for the position then occupied by said aircraft, and said switch means operating in said engaging position to disable said reversible motor means whereby said servomotor means actuates said control surface to stabilize said aircraft in the position occupied thereby at the time said switching means is actuated from said synchronizing position to said engaging position.

16. In an automatic pilot for aircraft having a rudder for steering said aircraft about a control axis, a control device having an output which is normally balanced but which becomes unbalanced in opposite senses in response to the character of input signals supplied thereto, an azimuth-position maintaining means, signal generator means, means for varying the output of said signal generator in accordance with the azimuth position of said aircraft relative to said azimuth-position maintaining means, a course setter for additionally varying the output of said signal generator independently of the position of said azimuth-position maintaining means, means for supplying input signals to said control device in accordance with the output of said signal generator to unbalance said control device in either sense, servomotor means responsive, when operative, to the sense of unbalance of said control device for actuating said control surface to stabilize said aircraft in azimuth, reversible motor means responsive, when operative, to the sense of unbalance of said control device for actuating said course setter to restore balance to said control device independently of the position of said azimuth-position maintaining means, and switching means having a synchronizing position and an engaging position for selectively disabling said reversible motor means and said servomotor means, said switching means operating in said synchronizing position to disable said servomotor means whereby said reversible motor means balances said control device for the azimuth position then occupied by said aircraft, and said switch means operating in said engaging position to disable said reversible motor means whereby said servomotor means actuates said control surface and stabilizes said aircraft in azimuth in the position occupied thereby at the time said switching means is actuated from said synchronizing position to said engaging position.

17. In an automatic pilot for aircraft having a control surface for controlling the movement of said aircraft about a control axis, stabilizing means responsive to a displacement of said aircraft about a control axis for actuating said control surface to stabilize the attitude of said aircraft, a pendulum pivoted for movement about an axis parallel to said control axis, a control circuit comprising a capacitor and a resistance, means controlled by said pendulum for connecting a direct current charging voltage to said circuit the magnitude of which varies in accordance with the position of said pendulum, said control circuit constituting an RC time delay network whereby the voltage across said capacitor responds relatively slowly to the position of said pendulum and thereby represents an average position of said pendulum as said pendulum oscillates, and trim means cooperating with said stabilizing means for varying the stabilized attitude of said aircraft in accordance with the magnitude of the voltage across said capacitor.

18. In an automatic pilot for aircraft having a control surface for controlling movement of said aircraft about a control axis, stabilizing means responsive to a displacement of said aircraft about said control axis for actuating said control surface to stabilize the attitude of said aircraft, a pendulum pivoted for movement about an axis parallel to said control axis, a control circuit comprising a capacitor and a resistance, a source of D.-C. voltage, switch means controlled by said pendulum for connecting said D.-C. voltage to said control circuit when said pendulum deflects in one direction from a center position and for disconnecting said D.-C. voltage from said control circuit when said pendulum deflects in the opposite direction, said control circuit constituting an RC time delay network whereby the voltage across said capacitor responds relatively slowly to the application and removal of said D.-C. voltage by said pendulum controlled switch means and thereby represents an average position of said pendulum as said pendulum oscillates, and trim means cooperating with said stabilizer means for varying the stabilized attitude of said aircraft in accordance with the magnitude of the voltage across said capacitor.

CHARLES M. YOUNG.
ROBERT L. WANAMAKER.

REFERENCES CITED

The following references are of record in the file of this patent:

UNITED STATES PATENTS

| Number | Name | Date |
|---|---|---|
| 1,065,656 | Benni | June 24, 1913 |
| 2,016,857 | Fischel | Oct. 8, 1935 |
| 2,054,945 | Nishet | Sept. 22, 1936 |
| 2,120,950 | Hodgman | June 14, 1938 |
| 2,137,974 | Fischel | Nov. 22, 1938 |
| 2,220,055 | Fischel et al. | Oct. 29, 1940 |
| 2,415,429 | Kellogg et al. | Feb. 11, 1947 |
| 2,466,702 | Hamby | Apr. 12, 1949 |

OTHER REFERENCES

"Electronics" of October 1944, pages 110 to 117, inclusive.